US010296444B1

(12) United States Patent
Choudhary et al.

(10) Patent No.: US 10,296,444 B1
(45) Date of Patent: May 21, 2019

(54) METHODS AND SYSTEMS FOR TESTING MOBILE APPLICATIONS FOR ANDROID MOBILE DEVICES

(71) Applicant: Georgia Tech Research Corporation, Atlanta, GA (US)

(72) Inventors: Shauvik Roy Choudhary, Atlanta, GA (US); Mattia Fazzini, Atlanta, GA (US); Alessandro Orso, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 15/613,429

(22) Filed: Jun. 5, 2017

Related U.S. Application Data

(60) Provisional application No. 62/345,562, filed on Jun. 3, 2016.

(51) Int. Cl.
    *G06F 11/36*     (2006.01)

(52) U.S. Cl.
    CPC ...... *G06F 11/3684* (2013.01); *G06F 11/3664* (2013.01); *G06F 11/3692* (2013.01); *G06F 11/3696* (2013.01)

(58) Field of Classification Search
    CPC ............. G06F 11/3664; G06F 11/3684; G06F 11/3692; G06F 11/3696
    USPC ........................... 717/124–135; 714/37, 38.1
    See application file for complete search history.

(56) References Cited

U.S. PATENT DOCUMENTS

| | | | | |
|---|---|---|---|---|
| 6,526,526 | B1 * | 2/2003 | Dong | G06F 11/3438 714/46 |
| 6,662,217 | B1 * | 12/2003 | Godfrey | H04L 43/50 709/203 |
| 2003/0159089 | A1 * | 8/2003 | DiJoseph | G06F 11/3664 714/38.1 |
| 2014/0047417 | A1 * | 2/2014 | Kaasila | G06F 11/3664 717/135 |
| 2015/0227452 | A1 * | 8/2015 | Raghavan | G06F 11/3664 717/124 |

(Continued)

OTHER PUBLICATIONS

Amalfitano et al., "A GUI Crawling-based technique for Android Mobile Application Testing," 2011, IEEE, p. 252-261.*

(Continued)

*Primary Examiner* — Qing Chen
(74) *Attorney, Agent, or Firm* — DLA Piper LLP (US)

(57) ABSTRACT

Systems and method for testing an application for an Android mobile device. Interactions can be recorded between a user and the application on the Android mobile device using only the Android mobile device, wherein the recorded interactions can be recorded using at least two types of selectors. Oracles can be recorded on the Android mobile device using only the Android mobile device, wherein the recorded oracles can comprise user-specified expected results of the recorded interactions for the testing, and wherein the recorded oracles can be recorded using the at least two types of selectors. The recorded interactions and the recorded oracles can be translated into test scripts on the Android mobile device using only the Android mobile device. The application can be tested on the Android mobile device by executing the test scripts using only the Android mobile device.

34 Claims, 23 Drawing Sheets

(56) References Cited

U.S. PATENT DOCUMENTS

2017/0337116 A1* 11/2017 Negara ............... G06F 11/3664

OTHER PUBLICATIONS

Amalfitano et al., "Using GUI Ripping for Automated Testing of Android Applications," Sep. 2012, ACM, p. 258-261.*
Amalfitano et al., "A Toolset for GUI Testing of Android Applications," 2012, IEEE, p. 650-653.*
Baresi et al., "Test Oracles," Aug. 4, 2001, p. 1-55.*
Gomez et al., "RERAN: Timing- and Touch-Sensitive Record and Replay for Android," 2013, IEEE, p. 72-81.*
Helppi, Ville-Veikko, "How to Use Espresso V2.0 With Testdroid Cloud Devices," <https://bitbar.com/how-to-use-espresso-v2-0-with-testdroid-cloud-devices/>, Jan. 20, 2015, p. 1-7.*
Hu et al., "Automating GUI Testing for Android Applications," May 2011, ACM.*
Kaasila et al., "Testdroid: automated remote UI testing on Android," Dec. 2012, ACM.*
Lin et al., "On the Accuracy, Efficiency, and Reusability of Automated Test Oracles for Android Devices," Oct. 2014, IEEE, p. 957-970.*
Liu et al., "Capture-Replay Testing for Android Applications," 2014, IEEE, p. 1129-1132.*
SmartBear Community, "Running 1 set of tests on different versions of 1 tested app," <https://community.smartbear.com/t5/TestComplete-General-Discussions/Running-1-set-of-tests-on-different-versions-of-1-tested-app/td-p/78913>, Mar. 18, 2013, p. 1.*
Takala et al., "Experiences of System-Level Model-Based GUI Testing of an Android Application," 2011, IEEE, p. 377-386.*
Wahlbin, Kathy, "Setting Up iOS and Android for Mobile Accessibility Testing," <http://www.interactiveaccessibility.com/blog/ios-and-android-mobile-accessibility#.WqakpmaWxaQ>, Nov. 6, 2012, p. 1-3.*
Android Screencast, https://code.google.com/p/androidscreencast/, (2015).
Automating User Interface Tests, http://developer.android.com/tools/testing/testingui.html, (2015).
BroadcastReceiver, http://developer.android.com/reference/android/content/BroadcastReceiver.html, (2015).
Creating an Input Method, http://developer.android.com/guide/topics/text/creating-input-method.html, (2015).
Developing an Accessibility Service, http://developer.android.com/training/accessibility/service.html, (2015).
Espresso, https://code.google.com/p/android-test-kit/, (2015).
F-Droid, https://f-droid.org, (2015).
Google Play, https://play.google.com/store, (2015).
Java EE, http://www.oracle.com/technetwork/java/javaee/overview/index.html, (2015).
JavaPoet, https://github.com/square/javapoet, (2015).
Lint, http://developer.android.com/tools/help/lint.html, (2015).
Services, http://developer.android.com/guide/components/services.html, (2015).
Spoon, http://square.github.io/spoon, (2015).
Testdroid Recorder, http://testdroid.com/products, (2015).
UI/Application Exerciser Monkey, http://developer.android.com/tools/help/monkey.html, (2015).
Uses SDK, http://developer.android.com/guide/topics/manifest/uses-sdk-element.html, (2015).
S. Anand, M. Naik, M. J. Harrold, and H. Yang. Automated Concolic Testing of Smartphone Apps, In Proceedings of the ACM SIGSOFT 20th International Symposium on the Foundations of Software Engineering, 15 pages, (2012).
W. Choi, G. Necula, and K. Sen, Guided GUI Testing of Android Apps with Minimal Restart and Approximate Learning. In Proceedings of the 2013 ACM SIGPLAN International Conference on Object Oriented Programming Systems Languages & Applications, 17 pages, (2013).
S. Hao, B. Liu, S. Nath, W. G. Halfond, and R. Govindan, PUMA: Programmable UI-automation for large-scale dynamic analysis of mobile apps. In Proceedings of the 12th Annual International Conference on Mobile Systems, Applications, and Services, 14 pages, (2014).
Y.-D. Lin, E.-H. Chu, S.-C. Yu, and Y.-C. Lai, Improving the accuracy of automated GUI testing for embedded systems. Software, 7 pages, IEEE, (2014).
A. Machiry, R. Tahiliani, and M. Naik, Dynodroid: An Input Generation System for Android Apps. In Proceedings of the 2013 9th Joint Meeting on Foundations of Software Engineering, 11 pages, (2013).
R. Mahmood, N. Mirzaei, and S. Malek, EvoDroid: Segmented Evolutionary Testing of Android Apps. In Proceedings of the 22nd ACM SIGSOFT International Symposium on Foundations of Software Engineering, 11 pages, (2014).
R. Sasnauskas and J. Regehr, Intent Fuzzer: Crafting Intents of Death. In Proceedings of the 2014 Joint International Workshop on Dynamic Analysis (WODA) and Software and System Performance Testing, Debugging, and Analytics (PERTEA), 6 pages, (2014).
H. Van der Merwe, B. van der Merwe, and W. Visser, Execution and Property Specifications for JPF-android. SIGSOFT Softw. Eng. Notes, 5 pages, (2014).
W. Yang, M. R. Prasad, and T. Xie, A Grey-box Approach for Automated GUI-model Generation of Mobile Applications. In Proceedings of the 16th International Conference on Fundamental Approaches to Software Engineering, 16 pages, (2013).
H. Ye, S. Cheng, L. Zhang, and F. Jiang, DroidFuzzer: Fuzzing the Android Apps with Intent-Filter Tag. In Proceedings of International Conference on Advances in Mobile Computing &; Multimedia, 7 pages, (2013).
T. Yeh, T.-H. Chang, and R. C. Miller, Sikuli, Using GUI Screenshots for Search and Automation. In Proceedings of the 22Nd Annual ACM Symposium on User Interface Software and Technology, 10 pages, (2009).
H. Zadgaonkar, Robotium Automated Testing for Android. Packt Publishing Ltd, 94 pages, (2013).
M. H. Y. Zhu, R. Peri, and V. J. Reddi, Mosaic: Cross-Platform User-Interaction Record and Replay for the Fragmented Android Ecosystem. In Performance Analysis of Systems and Software (ISPASS), 2015 IEEE International Symposium on, 10 pages, (2015).

* cited by examiner

```
trace-def         ::= trace main-activity actions
main-activity     ::= string
actions           ::= action | action, actions
action            ::= interaction-def | assertion-def | key-def
interaction-def   ::= interaction i-type selector timestamp i-props
i-type            ::= click | long click | type | select | scroll
selector          ::= resource-id | xpath | properties-based
resource-id       ::= string
xpath             ::= string
properties-based  ::= element-class element-text
element-class     ::= string
element-text      ::= string
timestamp         ::= number
i-props           ::= | exprs
assertion-def     ::= assertion a-type selector timestamp a-props
a-type            ::= checked | clickable | displayed | enabled | focus
                      | focusable | text | child | parent | sibling
a-props           ::= | selector | exprs
key-def           ::= key key-type timestamp
key-type          ::= action | close
exprs             ::= expr | expr, exprs
expr              ::= bool | number | string
```

| Property | Description |
|---|---|
| CHECKED | The element is checked |
| CLICKABLE | The element can be clicked |
| DISPLAYED | The element is entirely visible to the user |
| ENABLED | The element is enabled |
| FOCUS | The element has focus |
| FOCUSABLE | The element can receive focus |
| TEXT | The element contains a specific text |
| CHILD | Child-parent relationship between two elements in the UI |
| PARENT | Parent-child relationship between two elements in the UI |
| SIBLING | Sibling relationship between two elements in the UI |

2000

2100

2300

METHODS AND SYSTEMS FOR TESTING MOBILE APPLICATIONS FOR ANDROID MOBILE DEVICES

This application claims priority to U.S. Provisional 62/345,562 filed on Jun. 3, 2016 and entitled "Barista: Effective Android Testing through Record/Replay", which is herein incorporated by reference for all purposes.

BRIEF DESCRIPTION OF THE DRAWINGS

FIG. 18 illustrates the abstract syntax for a recorded trace, according to embodiments of the invention.

FIG. 19 is a table that illustrates reporting the properties and providing a brief description of the properties, according to embodiments of the invention.

DESCRIPTION OF EMBODIMENTS OF THE INVENTION

Figure 1:
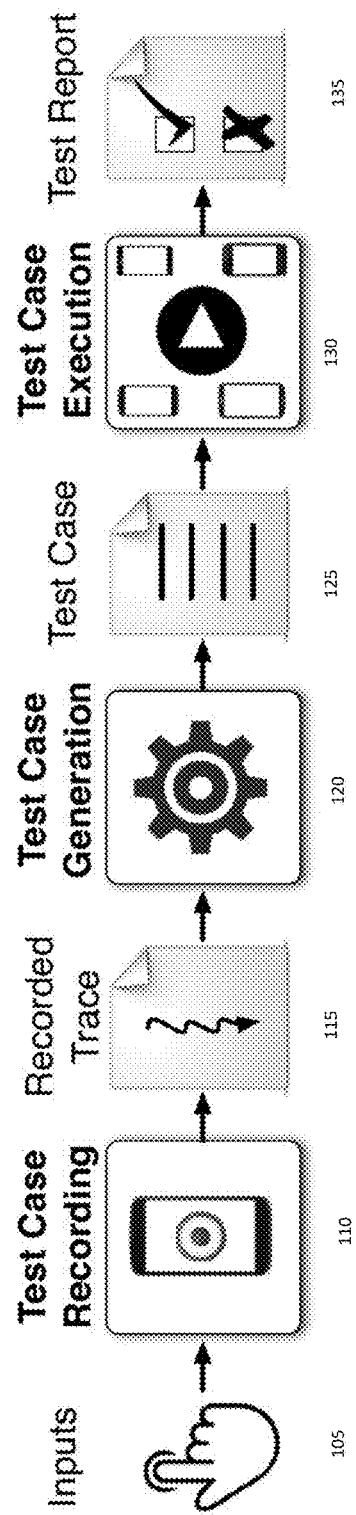
FIG. 1 illustrates a high-level overview of the method for testing mobile applications, according to some embodiments of the invention.

A system and Method (also referred to as techniques in this description) are provided for testing mobile applications ("apps") for Android mobile devices. In some embodiments, these mobile apps may run on a multitude of devices and operating system versions. In some embodiments, a technique is provided that may allow testers to easily create platform independent test scripts for a mobile app and automatically run the generated test scripts on multiple devices and operating system versions. In some embodiments, the technique may do so without modifying the app under test or the runtime system, by intercepting the interactions of the tester with the app and/or providing the tester with an intuitive way to specify expected results that it then encode as test oracles. This technique may be implemented in some embodiments using a tool named BARISTA. Those of ordinary skill in the art will see that other skills can also be used. In some embodiments, the technique can: encode user defined test cases as test scripts with built-in oracles and/or generate test scripts that can run on multiple platforms.

Like other software applications, apps may be tested to gain confidence that they behave correctly under different inputs and conditions. In the case of Android apps, the picture may be further complicated by the fragmentation of the Android ecosystem, which may include countless devices that come in all shapes and sizes and that can run a number of different versions of the Android operating system. The methods and systems taught herein discuss techniques for testing that, in some embodiments, do not need to follow a test script that describes which actions to perform (e.g., manually) on the app (e.g., entering a value in a text entry or pushing a button) and which results to expect in return (e.g., a confirmation message after submitting some information). In addition, in some embodiments, the techniques do not need to encode actions and expected results in some testing framework, such as Google's ESPRESSO, which is part of the Android Testing Support Library.

The methods and systems taught herein may, in some embodiments, provide techniques that allow testers to interact with an app and: (1) record the actions they perform on the app and/or (2) specify the expected results of such actions using a new, intuitive mechanism. In addition, in some embodiments, the techniques may automatically encode the recorded actions and specified expected results in the form of a general, platform-independent test script. Furthermore, the techniques may allow for automatically running the generated test scripts on any platform (e.g., device and operating system), either on a physical device or in an emulator.

In some embodiments, the techniques may also implement the record once-run everywhere principle. Testers can record their tests on one platform and may rerun them on any other platform. By running the generated tests on multiple platforms including different devices and on various operating system versions, they can detect differences in application behavior across such platforms. Thus, the tests can be used for Compatibility testing, to find cross-platform issues in the application under test (AUT) where the difference in behavior limits the application's functionality for its user. In addition, in some embodiments, the techniques may support the creation of oracles, and this may be done an intuitive way. This approach can be used with very limited training, as it does not require any special skill or knowledge. Additionally, because of the way the techniques encode test cases, the generated tests can be robust in the face of some changes in the user interface of the app and/or may be unaffected by changes that do not modify the user interface. In this way, the test cases generated by the techniques can also be used for regression testing. From a more practical standpoint, in some embodiments, the techniques may generate test cases in a standard format, such as the one used in the ESPRESSO framework. Embodiments of the invention can also run on other frameworks (e.g., APPIUM, UI AUTOMATOR, ROBOTIUM, CALABASH). Those of ordinary skill we see that other frameworks can also be used. The generated test cases can therefore be run as standalone tests in some embodiments. The system provided can also be minimally intrusive. It may leverage accessibility mechanisms already present on the Android platform, and thus may not need to instrument the apps under test (AUTs). To use the approach, testers may only have to install an app on the device on which they want to record their tests, enable the accessibility framework for it, and start recording.

The techniques discussed herein may handle several practical challenges specific to the Android operating system. As the information required for replay does not need to be directly available from accessibility events, the techniques may need to reconstruct this information. This may be particularly challenging as BARISTA runs in a separate sandbox than the Application Under Test (AUT). The techniques may also need to process events in a timely fashion, in the face of a constantly evolving user interface. It may do this by efficiently caching the Graphic User Interface (GUI) hierarchy and performing operations on its local cache. The techniques can use BARISTA to encode user recorded test cases and oracles as Espresso tests. In some embodiments, the system can, for example, using BARISTA: (1) faithfully record and encode most user defined test cases; (2) generate test cases that run on multiple platforms; or (3) provide adequate support for oracle generation; or any combination thereof. In some embodiments, the system can easily record, encode in a standard format, and execute in a platform independent manner test cases for Android apps. Additionally, the system can, using BARISTA, use ESPRESSO test cases (freely available for download).

In some embodiments, the system is easy to use because in order to run the tests, testers (e.g., developers) do not need to specify the correct identifier for each interaction and assertion defined. Thus, the system may not require analyzing layout files in the source code of the AUT and/or using a UIAUTOMATORVIEWER tool (e.g., provided as part of the Android SDK). Finding identifiers and/or writing test cases may not be required. Instead, the simplicity of manual testing combined with the advantages provided by automated testing may be used in some embodiments.

Throughout this description, we present example techniques for recording, generating, and executing test cases for Android apps. FIG. 1 provides a high-level overview of our technique, which may comprise three main phases: the test case recording phase 110; the test case generation phase 120, and the test case execution phase 130. In the test case recording phase, the user may interact with the AUT with the goal of testing its functionality. Our technique may record user interactions and may offer a convenient interface to define assertion-based oracles. When the user signals the end of the recording phase, the technique may enter its test case generation phase, which may translate recorded interactions and oracles into test cases that are (as much as possible) device independent. In the test case execution phase, our technique may execute the generated test cases on multiple devices and may summarize the test results in a report. These three phases are described in more detail below along with an example embodiment.

A. Test Case Recording

In the test case recording phase, the user may record test cases by exercising the functionality of an app. This phase may receive the package name of the AUT as input. To record a divide by zero test case, for example, the user could indicate com.calculator as input of this phase.

Based on the package name provided, the technique can launch the app's main activity, and, at the same time, may create a menu. The menu can be displayed as a floating menu above the AUT and can be movable, so that it does not interfere with the user interaction with the app. The elements in the menu can allow the user to (1) define assertion-based oracles, (2) use system buttons (i.e., back and home buttons), and/or (3) stop the recording.

As soon as the app is launched, and the menu is visible to the user, a second component may start operating: the recorder. This component, which can be the core component of the test case recording phase, can be used to (1) access the UI displayed by the AUT, (2) process user interactions, and/or (3) assist the oracle definition process. The recorder can leverage the accessibility functionality provided by the Android platform to register for certain kinds of events and be notified when such events occur. The recorder can use these accessibility capabilities to listen to two categories of events: events that describe a change in the UI and/or events that are fired as consequence of user interactions. Events in the former category can be used to create a reference that uniquely identifies an element in the app's UI. We call this reference the selector of the element. Events in the latter category, instead, can be logged in the recorded trace. Specifically, the recorder can: (1) store the type of interaction, (2) identify the UI element affected by the interaction and defines a selector for it, and/or (3) collect relevant properties of the interaction. The recorder can process oracles in a similar fashion: it can (1) store the type of oracle, (2) identify the UI element associated with the oracle and/or defines a selector for it, and/or (3) saves the details of the oracle (e.g., an expected value for a field). These interactions and user defined oracles can be logged by the recorder in a recorded trace in the form of actions. When the user stops the recorder, our technique can pass the content of the recorded trace to the test case generation phase.

In the rest of this section, we discuss the information collected in the recorded trace, describe how the recorder defines selectors, present what type of interactions are recognized by our technique, and describe the oracle creation process.

i. Recorded Trace

FIG. 18 shows the abstract syntax for a recorded trace, according to an embodiment. The beginning of the trace can be defined by the trace-def production rule, which can indicate that a trace can comprise the name of the main activity followed by a list of actions. The types of actions logged into the recorded trace can be indicated by the action production rule.

ii. Selectors

Our technique can create a selector for all interactions and oracles, which can be used to accurately identify the UI element associated with these actions and can be independent from the screen size of the device used in this phase. The technique can define and use three types of selectors: (1) the resource ID selector (resource-id in FIG. 18), (2) the XPath selector xpath), and (3) the property-based selector (property-based). The resource ID selector can correspond to the Android resource ID that can be associated to a UI element; the XPath selector can identify an element based on its position in the UI tree (as the UI tree can be mapped to an XML, document); and/or the property-based selector can identify an element based on two properties: the class of the element (element-class) and/or the text displayed by the element, if any (element-text)

Our technique may not use the Android resource ID as its only type of selector for two reasons. First, the Android framework may not require a developer to specify the resource ID value for a UI element. In fact, while creating a layout file of an app, it is possible to omit the resource ID of UI elements declared in it. Second, the framework may not enforce uniqueness of IDs in the UI tree.

In addition, our technique may not use an element's screen coordinates as a selector because the Android ecosystem is too fragmented in terms of screen sizes; the screen coordinates of a UI element on a given device can considerably differ from the coordinates of the same element on a different device.

The recorder can aim to identify the most suitable type of selector for every interaction and oracle processed by leveraging the accessibility functionality of the Android platform. It can do so by analyzing the accessibility tree representing the UI displayed on the device. Each node in the tree can represent an element in the UI and can be characterized by two properties of interest: resource ID (if defined) and/or class of the node (e.g., the class of the UI element represented by the node). The recorder can navigate the accessibility tree to track uniqueness of resource IDs. More specifically, the recorder can create a map, which we call the resource ID map, where keys can be resource IDs of nodes in the tree, and the value associated to each key can be the number of nodes having a specific resource ID. To populate the resource ID map, the recorder can listen for two types of accessibility event: TYPE_WINDOW_STATE_CHANGED, which can be fired when the foreground window of the device changes (e.g., a new Activity is launched, a PopupWindow appears, a Dialog is shown), and/or TYPE_WINDOW_CONTENT_CHANGED, which can be fired when the content inside a window changes (e.g., when there is a partial change in the UI). Each time one of these two types of event is fired by the Android system, the recorder can populate the resource ID map with the information contained in the accessibility tree through a breadth-first traversal.

The information stored in the resource ID map can be used every time an interaction occurs or an oracle is defined by the user. More precisely, when the recorder processes these types of actions, it may consider the accessibility node associated with the action. The recorder may check whether the node has a resource ID and, if it does, may check for its uniqueness using the resource ID map. In case the resource ID is unique, the recorder can create a selector of type resource ID for that action.

When the window containing the element affected by an interaction transitions to the inactive state immediately after the interaction is performed (e.g., selection on a ListPreference dialog), the accessibility framework may not provide the reference to the node in the accessibility tree affected by the interaction. In this case, the recorder may not define a resource ID or XPath selector and may use a property-based selector instead. The property-based selector can leverage the information stored in the accessibility event representing the interaction (see the Interactions section for more details on events). This type of selector can identify an element in the UI using the class of the element and the text displayed by the element (if any). We selected these two properties because they may not change across devices with different screen properties.

The use of resource IDs over XPath and property-based selectors may be used because developers can explicitly define such IDs in the source code. Using them may favor readability and understandability of the generated tests.

iii. Interactions

The recorder can recognize user interactions by analyzing accessibility events, which can be created by the Android platform as a result of such interactions. These events can have a set of properties that describe the characteristics of the interactions. We illustrate a few examples of how the recorder can process two types of events. Other events can be handled following similar mechanisms.

Click:

Our technique can detect when a user clicks on a UI element by listening to accessibility events of type TYPE_VIEW_CLICKED. The recorder can encode an event of this type as an entry in the recorded trace (interaction-def in FIG. 18). More specifically, it can label the entry as of type click (i-type), identify the interaction selector (selector) as discussed in the Selectors section, and/or save the action timestamp (timestamp).

Type:

Our technique can recognize when a user types text into an app by processing accessibility events of type TYPE_VIEW_TEXT_CHANGED. However, naively recording events from this class could translate into having a recorded trace that is not accurate. In fact, the accessibility framework can generate an event of this type even when the text is typed programmatically as the result of a computation. Our technique can address this situation by using a finite-state machine (FSM). The FSM can leverage the fact that a user-typed text can be followed by an event of type TYPE_WINDOW_CONTENT_CHANGED. If the FSM observes this sequence, it can enter its accept state and record the event. Otherwise, the FSM can enters its reject state and ignores the event. Upon accepting an event of this type, the recorder can encode the event as an entry in the recorded trace (interaction-def), label the entry as of class type (i-type), identify the interaction selector (selector), save the action timestamp (timestamp) and add the text typed by the user to the properties of the entry (i-props). The Android system can fire this type of event every time a user changes the text contained in a text editable element. For this reason, text incrementally typed by a user can generate a sequence of events. This sequence of events can be processed in the test case generation phase to minimize the size of generated test cases (see the Generation section). After typing text, a user can click the input method action key (e.g., placed at the bottom-right corner of the on-screen keyboard) to trigger developer defined actions. The Android system may not generate accessibility events for this type of interaction. To address this problem, our technique may define a on-screen keyboard that can be used by the tester as a regular keyboard but can record this type of interaction as well. In response to this event, the recorder can add an entry (key-def) to its recorded trace (action). Our technique can handle in a similar fashion the key that, when clicked, hides the on-screen keyboard (close).

iv. Oracles

Oracles can be included in a test case. Our technique can support definition of assertion-based oracles, where assertions can fulfill a few purposes, comprising: either check the state of a UI element at a specific point of the execution and/or check the relationship of an element with another element in the UI. In the former case, the assertion can check for the value of a specific property characterizing an element state. In the latter case, the assertion can check the relationship between two elements based on their location in the UI tree.

FIG. 19 (Table 1) can report the properties that can be asserted using our technique and provides a brief description of them. Variations of the properties listed in Table 1 can also be asserted. For instance, our technique can be used to assert that the percentage of visible area of an element is above a user defined threshold. Moreover, the technique can also define assertions that check that a property of an element does not have a certain value.

Figure 4:
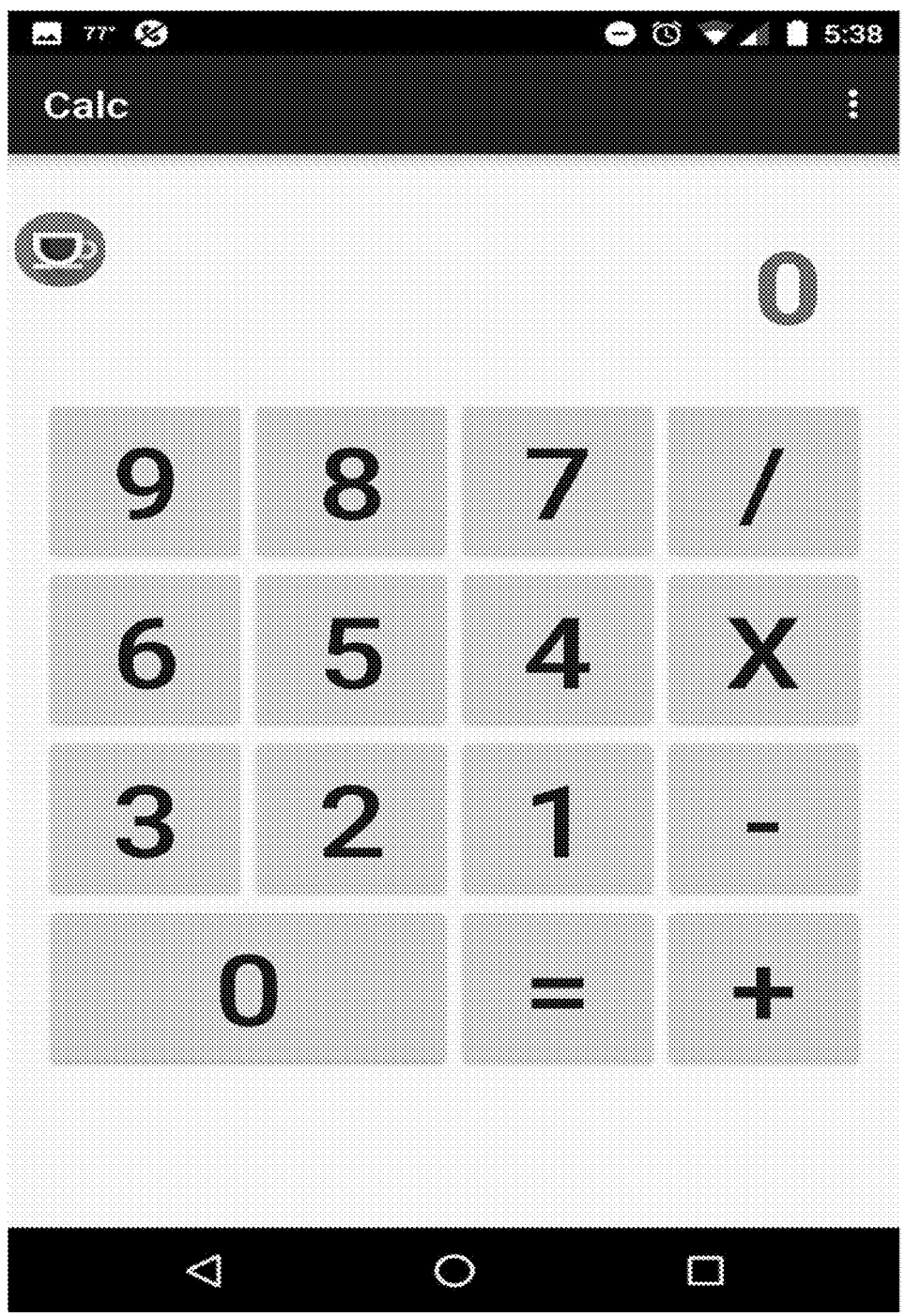
Figure 5:
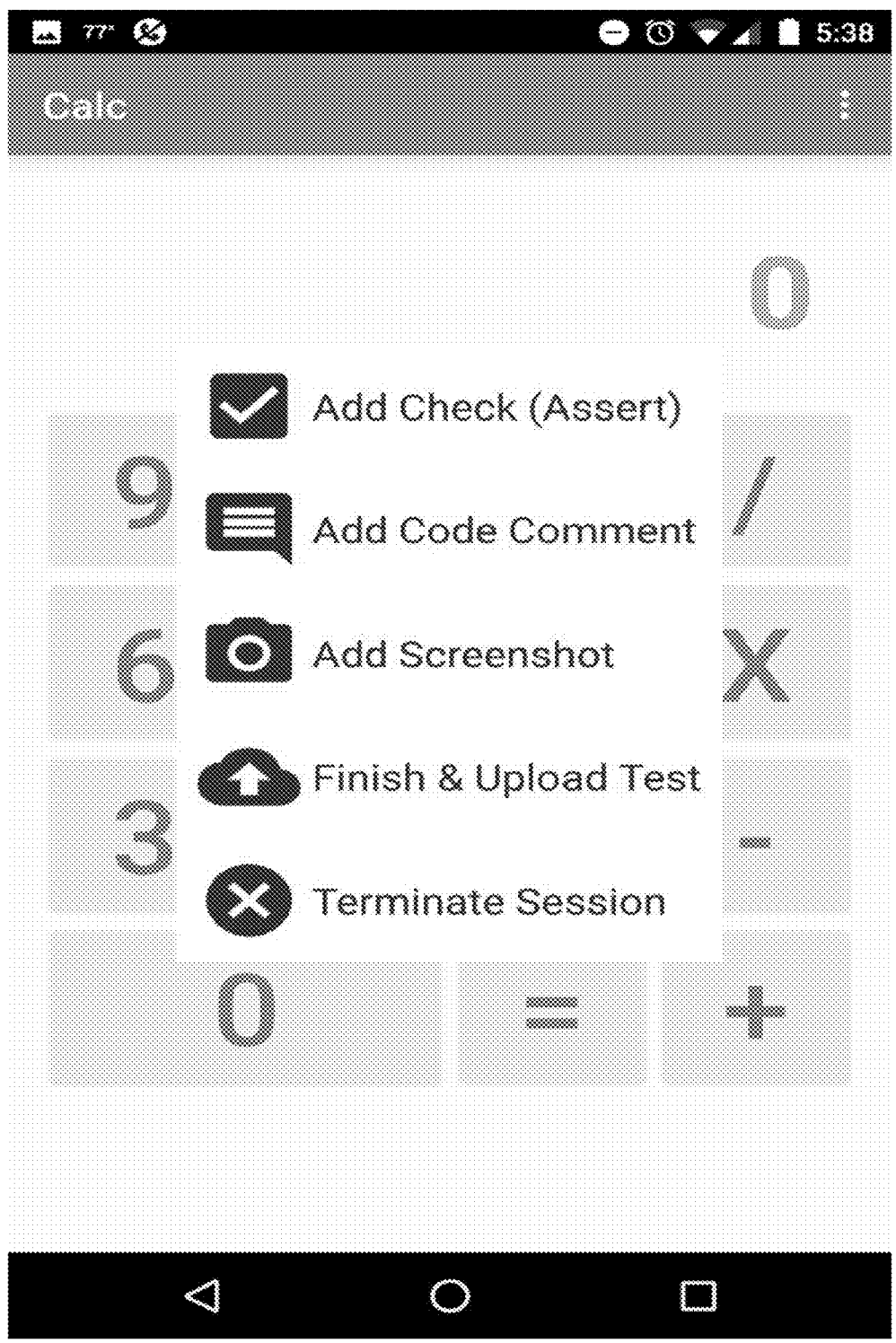
Figure 6:
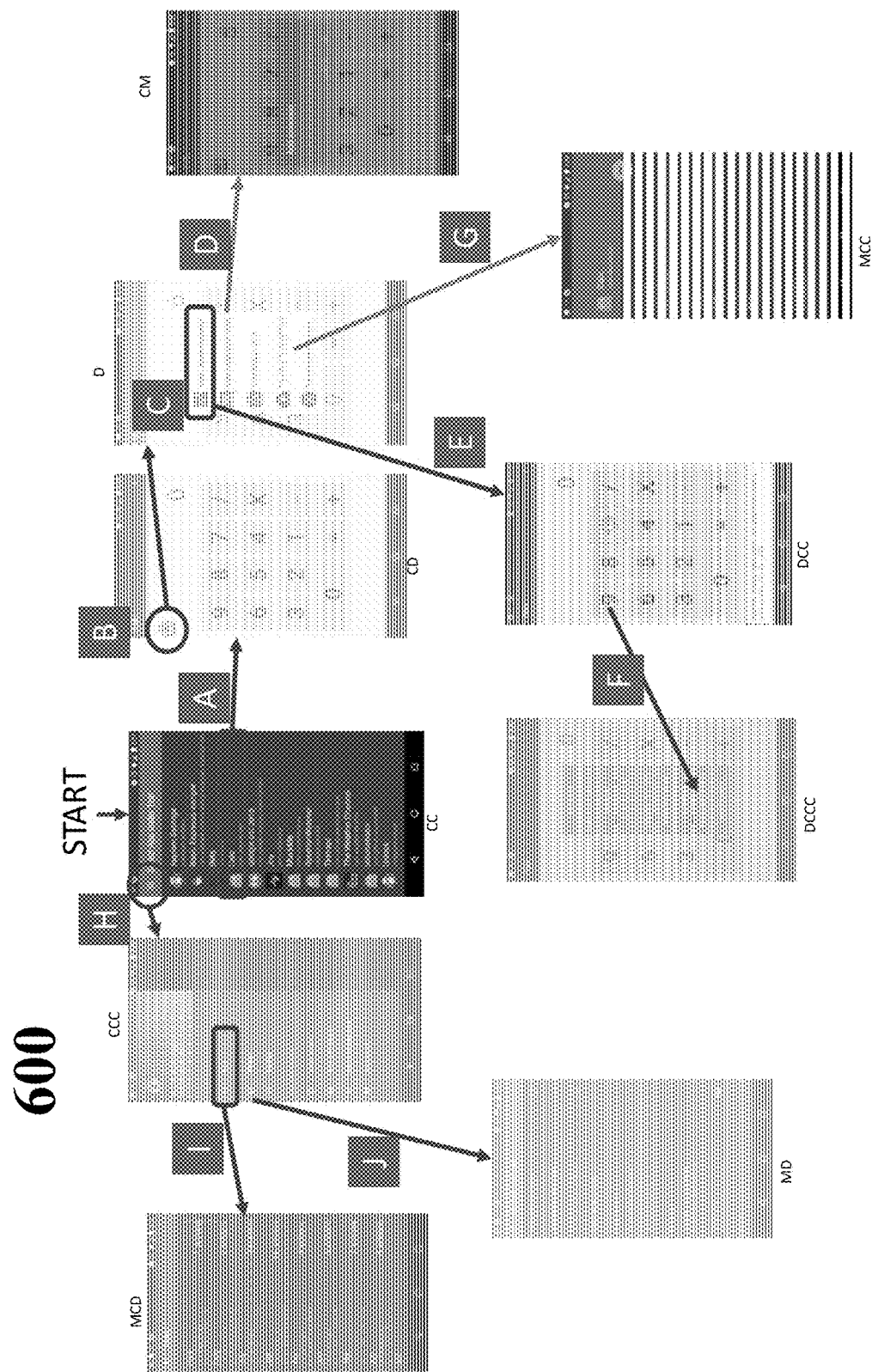
FIG. 6 illustrates screenshots of an example user interface experience, according to embodiments of the invention
Figure 7:
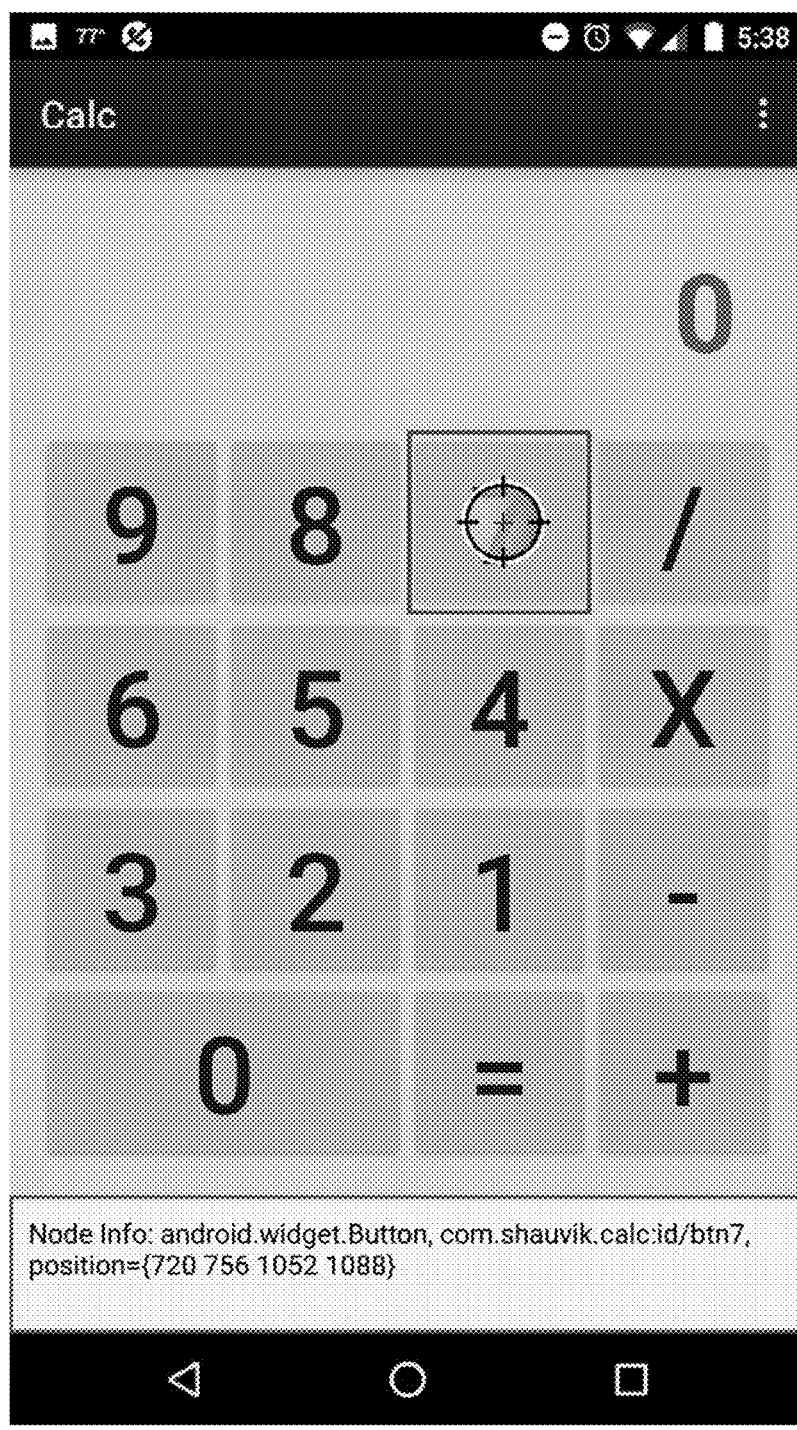
Figure 20:
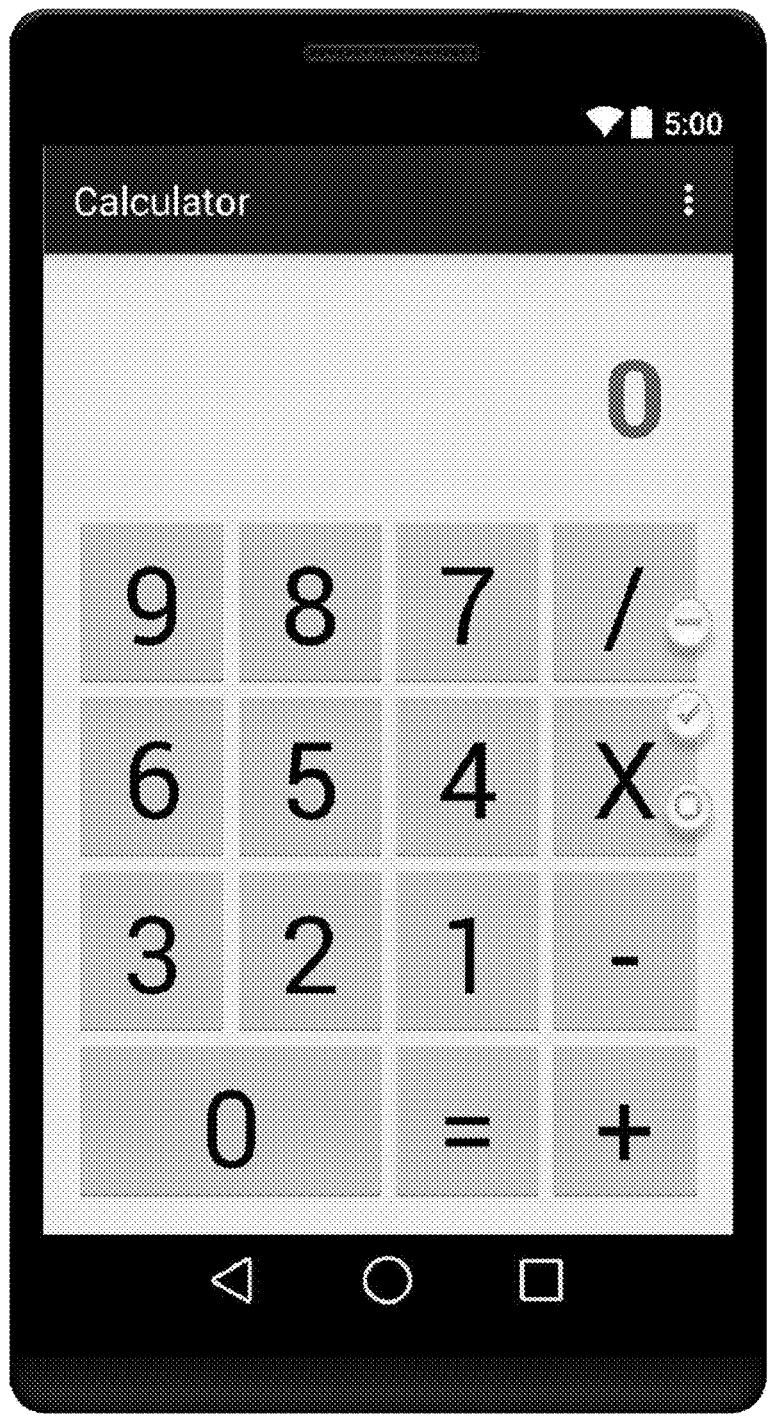
Figure 21:
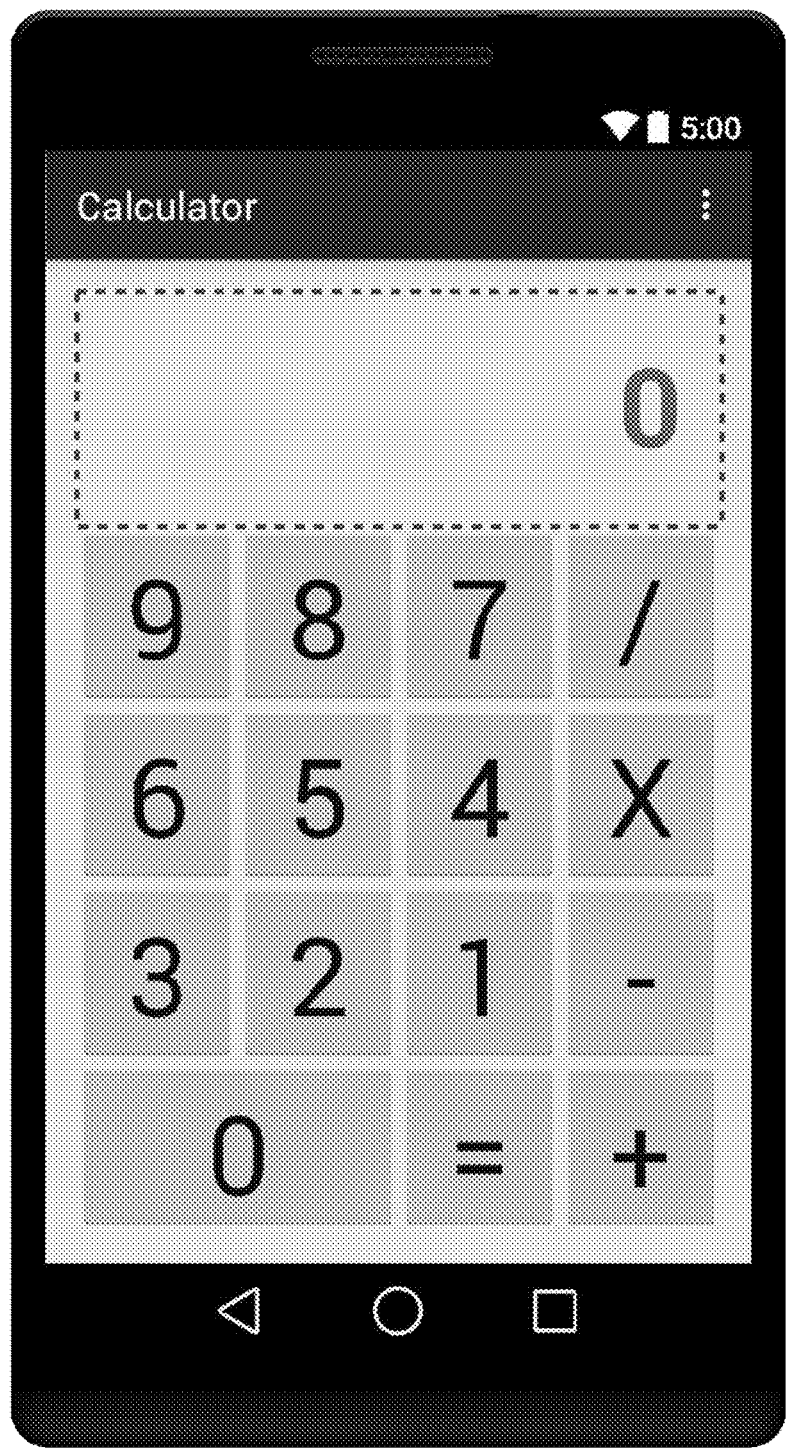

The menu and the recorder contribute together to the creation of assertions. FIGS. 4, 5, and 6 show part of the assertion creation process, according to embodiments of the invention. The user can start the process for defining an assertion by clicking the assert button in the menu (the button with the tick symbol in FIG. 20. The menu can then create the assertion pane, a see-through pane that can overlays the device screen entirely (FIG. 21). This pane can intercept all user interactions until the end of the assertion definition process and can be configured so that the Android system does not generate accessibility events for interactions on the pane. In this way, the interactions performed to create the assertion may not need be included in the recorded trace. At this point, the user can define assertions, comprising: automatic and/or manual.

Automatic Process:

In this case, the user can select an element in the UI, and our technique can automatically add assertions for each property of the element. The user can identify an element by clicking on the screen and the click can be intercepted by the assertion pane, which can pass the x and y coordinates of the click location to the recorder. The recorder, upon receiving these coordinates, can navigate the accessibility tree to find the node that represents the clicked element (e.g., the foreground node that encloses the coordinates). After identifying the node, the recorder can check the class of the UI element represented by the node and, based on this information, can create assertions to check the value of relevant properties of the element. For example, relevant properties for a button element comprise: DISPLAYED, ENABLED, CLICKABLE, LONG CLICKABLE, FOCUSED, FOCUSEABLE, SCROLLABLE, SELECTED, CHECKABLE. (Those of ordinary skill in the art will see that other properties may also used). For each asserted property, the recorder can create an entry in the recorded trace (assertion-def), suitably label the entry based on the property being checked (a-type), identify the selector for the assertion (selector) as described above, and add the current value of the property to the properties of the entry (a-props).

Manual Process:

In this case, assertions can be defined directly by the user. As shown in FIG. 19 (Table 1), the user can assert properties that affect either a single element or a pair of elements. We illustrate an example of how the technique works when asserting properties that affect one element. (Assertions that affect a pair of elements are defined similarly.) The user selects an element in the UI by long clicking (e.g., tap-hold-release) on it. Also in this case, the element is not affected by this action because the assertion pane intercepts the click. In response to the long click, the menu sends the x and y coordinates of the location being pressed to the recorder. The recorder explores the accessibility tree to find the node identified by the location, computes the screen location of the node's vertexes, and sends these coordinates back to the menu. The menu uses the coordinates to highlights the element, as shown in FIG. 18.

The user can then change the currently selected element by dragging the finger through the UI elements or accept the currently selected element by raising their finger from the screen. At this point, the recorder identifies the node on the accessibility tree as usual (e.g., in case the user changed it), checks the node class, and based on this information sends a list of assertable properties to the menu. The top of the list is populated with properties that are relevant to the node. As shown in FIG. 20, these properties are displayed in the proximity of the selected element by the menu. The user can then choose a specific property and the value to be considered in the assertion, and the menu sends the property and the value to the recorder. The recorder creates an entry in the recorded trace (assertion-def), suitably labels the entry based on the selected assertion property (a-type), identifies the selector for the assertion (selector), and adds the user defined value for the assertion to the properties of the entry (a-props).

Figure 22:
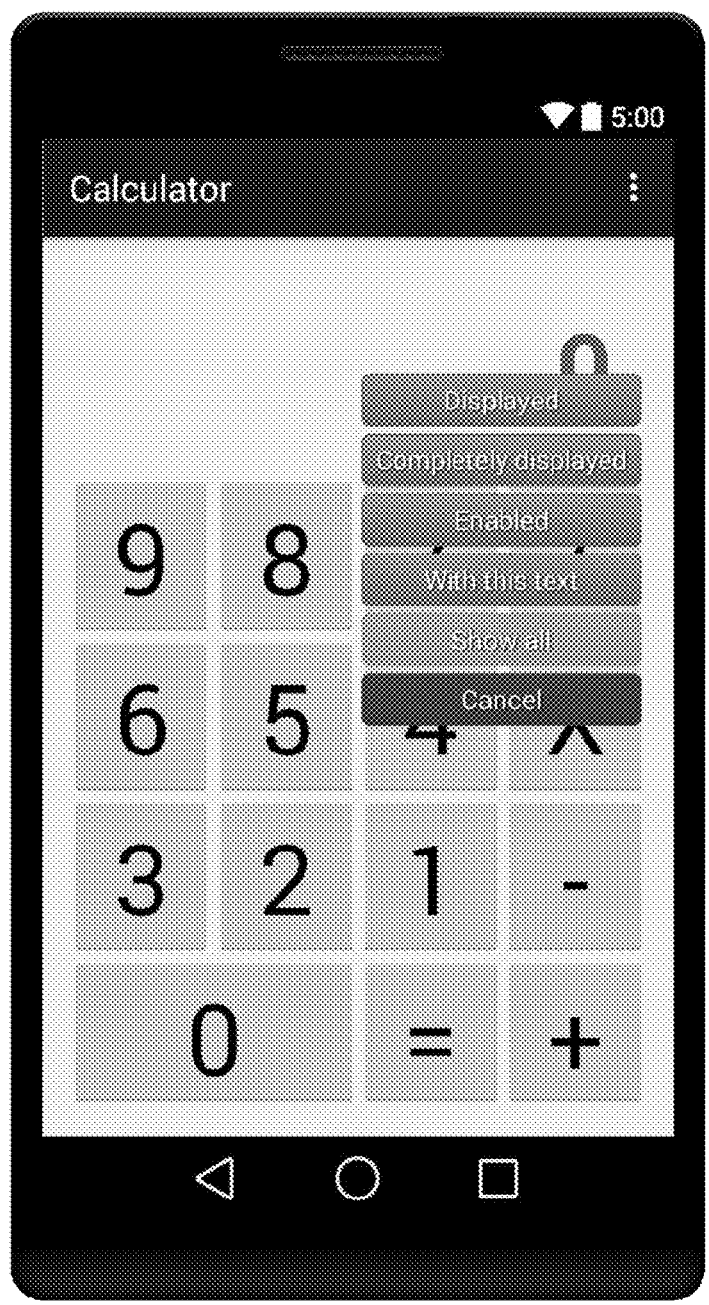

After starting the assertion definition process by clicking the button with the tick symbol (FIG. 20), the user selects the TextView element by long clicking on it (FIG. 21) and then selects "With this text" option to define the assertion (FIG. 22).

In both cases, after the recorder successfully adds the assertion to its recorded trace, it signals the end of the assertion definition process to the menu. The menu then removes the assertion pane from the screen, and the user can continue to interact with the app.

B. Test Case Generation

The test case generation phase can receive as input the recorded trace and a user-provided flag (e.g., retain-time flag) that can indicate whether the timing of recorded interactions should be preserved. For example, if a user sets a 30-seconds timer in an alarm clock app and wants to check with an assertion the message displayed when the timer goes off, he or she could set the retain-time flag to true to ensure that the assertion is checked 30 seconds after the timer is started. The test case generation phase can produce as output a test case that faithfully reproduces the actions performed by the user during the test case recording phase. In one example, the generated test case is an Android UI test case based on the Espresso framework. In the remainder of this section, we illustrate an example embodiment of how the technique translates the recorded trace into a test case, discuss the structure of the generated test case, and present the working mechanism of such test case.

The content of a generated test case can be divided into two parts: a part that prepares the execution of the test case (set-up) and a part the contains the actual steps of the test (steps). The two parts can be arranged so that the set-up part will execute before the steps part.

A goal of the set-up can be to load the starting activity of the test case. This phase can retrieve the value of the activity from the recorded trace (see main-activity in FIG. 18 and can add a statement to the set-up section of the test case that loads the activity. This step can be necessary in order to align the starting point of the recorded execution with that of the test case.

To generate the steps section of the test case, the technique can process all actions contained in the recorded trace (actions) and can generate a single-statement line for each one of them. The generated test case can thus contain a one-to-one mapping between actions and statements. This can favors readability and understanding of generated test cases, addressing a well-known problem with automatically generated tests in some embodiments. Test case statements that reproduce interactions and oracles can be divided into three parts. The first part can be used by the test case execution engine to retrieve the UI element affected by the action.

Our technique can place the selector (selector) of the action in this part of the statement. The second part of the statement can comprise the action that the test case execution engine performs on the UI element identified by the first part of the statement. The technique can encode this part of the statement with the Espresso API call corresponding to the action being processed (i-type or a-type). The third part of the statement can account for parameters involved in the action and is action specific. To create this part, our technique can retrieve the properties of the action (i-props or a-props).

The content of the generated test case can be affected by the retain-time flag as follows. If the flag is set, our technique can place an additional statement between statements representing two subsequent actions. This statement can pause the execution of the test cases (e.g., but not the execution of the app being tested) for a duration that is equal to the difference of the timestamps (timestamp) associated with the two actions.

C. Test Case Execution

The test case execution phase can take as input the test case produced by the second phase of the technique, together with a user-provided list of devices on which to run the test case, and can performs several tasks: (1) prepare a device environment for the test case execution, (2) execute the test case, and/or (3) generate the test report.

The first step can install the AUT and the generated test case on all devices in the user-provided list. Once the execution environment is set up, the technique can execute the test case on each device in the user-provided list in parallel. The execution of a test case can be supported through our extension of the Espresso framework and works as follows. The test case execution engine can load the starting activity of the test case. From this point forward, the engine can synchronize the execution of the test case's steps with the updates in the UI of the AUT.

The engine can process interaction and oracle statements as follows. For both types of actions, it can first navigate the UI displayed by the device to find the UI element referenced by the action. If the element is not present, the execution of the test case can terminate with an error. If the element is present, the execution engine can behave differently according to whether it is processing an interaction or an oracle statement. In the former case, the execution engine can inject a motion event into the app or perform an API call on the UI element being targeted by the interaction. In the case of an oracle statement, the execution engine can retrieve all elements in the UI that hold the property expressed by the oracle's assertions and can check whether the element targeted by the oracle is one of these elements. If the element is not present, the test case can terminate with a failure. Otherwise, the execution can continue.

At the end of the execution, the technique can generate a test case execution report that can contain: (1) the outcome of the test case on each device, (2) the test case execution time, and/or (3) debug information if an error or failure occurred during execution.

D. BARISTA Example Implementation

We implemented our technique in an example embodiment framework called BARISTA. There can be three main modules in the framework: (1) the recording module, which can implement the aspects of the test case recording phase (Section A); (2) the generation module, which can generate test cases as presented in the test case generation phase (Section B); and/or (3) the execution module, which can execute test cases as described in the test case execution phase (Section C). The recording module can be implemented as an Android app and can run on devices that use the platform API level 16 (Android 4.1) and above. The app may not require root access to the device to operate and may not require the device to be connected to an external computational unit during recording, as the test case recording can happen directly and entirely on the device. The generation and execution modules can be part of a web service implemented using a language such as Java. We describe these three components in more detail below.

i. BARISTA App

There are several components in the BARISTA app, comprising: (1) the menu component, (2) the recording component, and/or (3) the input method component. These three components can correspond, respectively, to the menu, recorder, and keyboard presented in Section A. The three components can run in distinct processes, which in turn can be different from the process in which the AUT is running. This design can allow BARISTA to perform its test case recording phase on all apps installed on the device without the need to instrument these apps.

The menu component can be implemented as an Android Service and can receive messages from other components through a BroadcastReceiver. The visual elements of the menu component can use the TYPE_SYSTEM_ALERT layout parameter, which can allow the menu to sit on top of the AUT. The recording component can be implemented as an AccessibilityService and can receive messages from other components through a BroadcastReceiver. Finally, the input method component can be an InputMethodService. When the user ends the recording phase, the app can attach the trace to an HTTP requests and can send it to the BARISTA web service.

ii. BARISTA Web Service

The generation module can use the JavaWriter library to create the source code of the generated test cases. BARISTA can generate test cases based on the Espresso framework. More precisely, BARISTA can extend Espresso to provide a larger API that implements the concepts introduced by the technique. The extended API can include the notion of XPath selector (added to the ViewMatcher class), a select action for multiple view elements (e.g., implemented by extending the ViewAction class), and an extended support for the scroll functionality. The BARISTA web service can use the Android Debug Bridge (ADB) server to prepare device environments and execute test cases. Test execution reports can be generated using the Spoon tool.

iii. Etc.

As stated above, our technique leverages the accessibility functionality of the Android platform to detect user interactions. In this way, the technique may not need to run on a rooted device, may not need customization of the underlying platform, and may not need to instrument the AUT. Our technique also can bind interactions and oracles with UI elements. In addition, BARISTA may support many aspects and states of the Android activity lifecycle (e.g., pausing, stopping, resuming, restarting) and may be able to suitably record transition among states, encode them within test cases, and/or suitably replay them.

E. Test Case Recording Method

Figure 23:
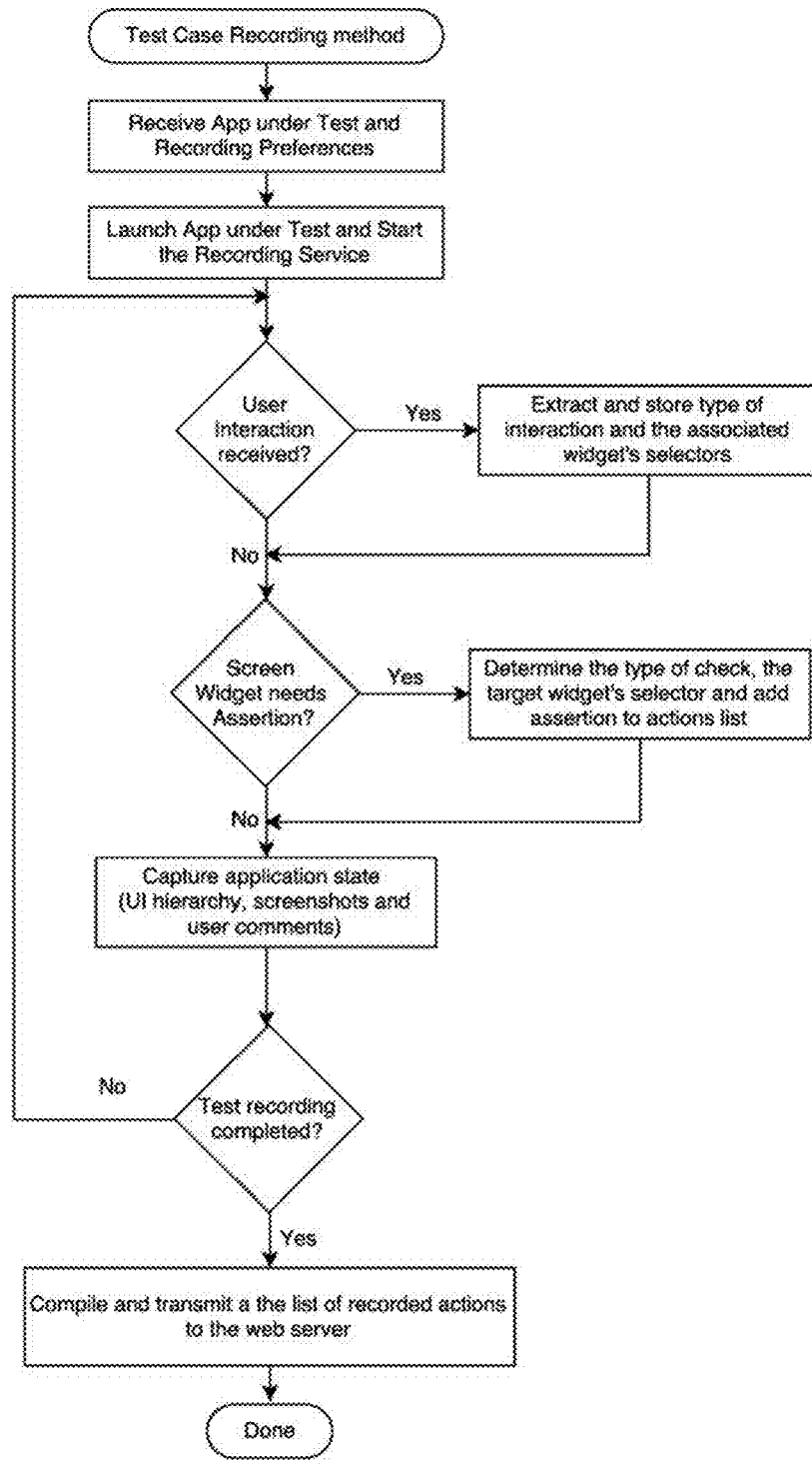
FIG. 23 illustrates a flowchart showing an example method used for recording a test case on the mobile device, according to some embodiments of the invention.

The flowchart in FIG. 23 shows an example method used for recording a test case on the mobile device. As inputs to the method, it can receive the app under test (AUT) and any preferences for the recording session. Examples for such preferences may include configuration parameters for the recording service and initial positions of the in-app widgets displayed during recording. Then the AUT can be launched and the recording service can be activated, which can include an accessibility service in the background to process the stream of user interactions and a menu service for actions such as starting capturing assertions or finish the recording session. During the test recording session, for each user interaction received by the service, it can extract and collect the details of the interaction including the selectors for the widget interacted with. Similarly, it can capture for every assertion the type of assertion and the target widget's selectors. The service can also periodically capture the application state, in the form for its UI hierarchy and any screenshots or comments from the user. Once the recording session is completed, the list of recorded actions can be compiled and sent to the web server for test generation.

F. Example of User Experience

Figure 2:
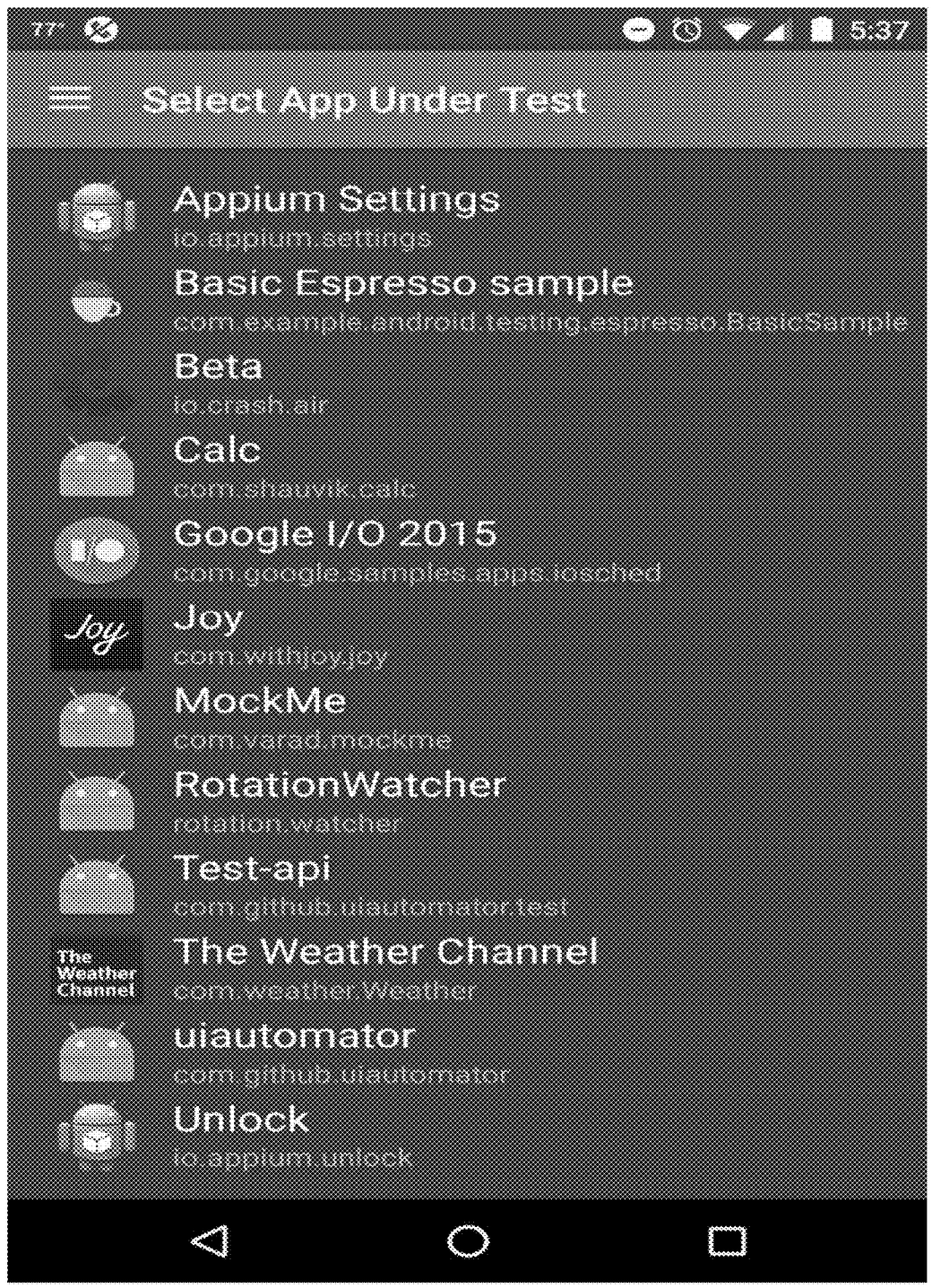
FIGS. 2-5, 7-17, and 20-22 illustrate example screenshots used in some embodiments of the invention.
Figure 3:
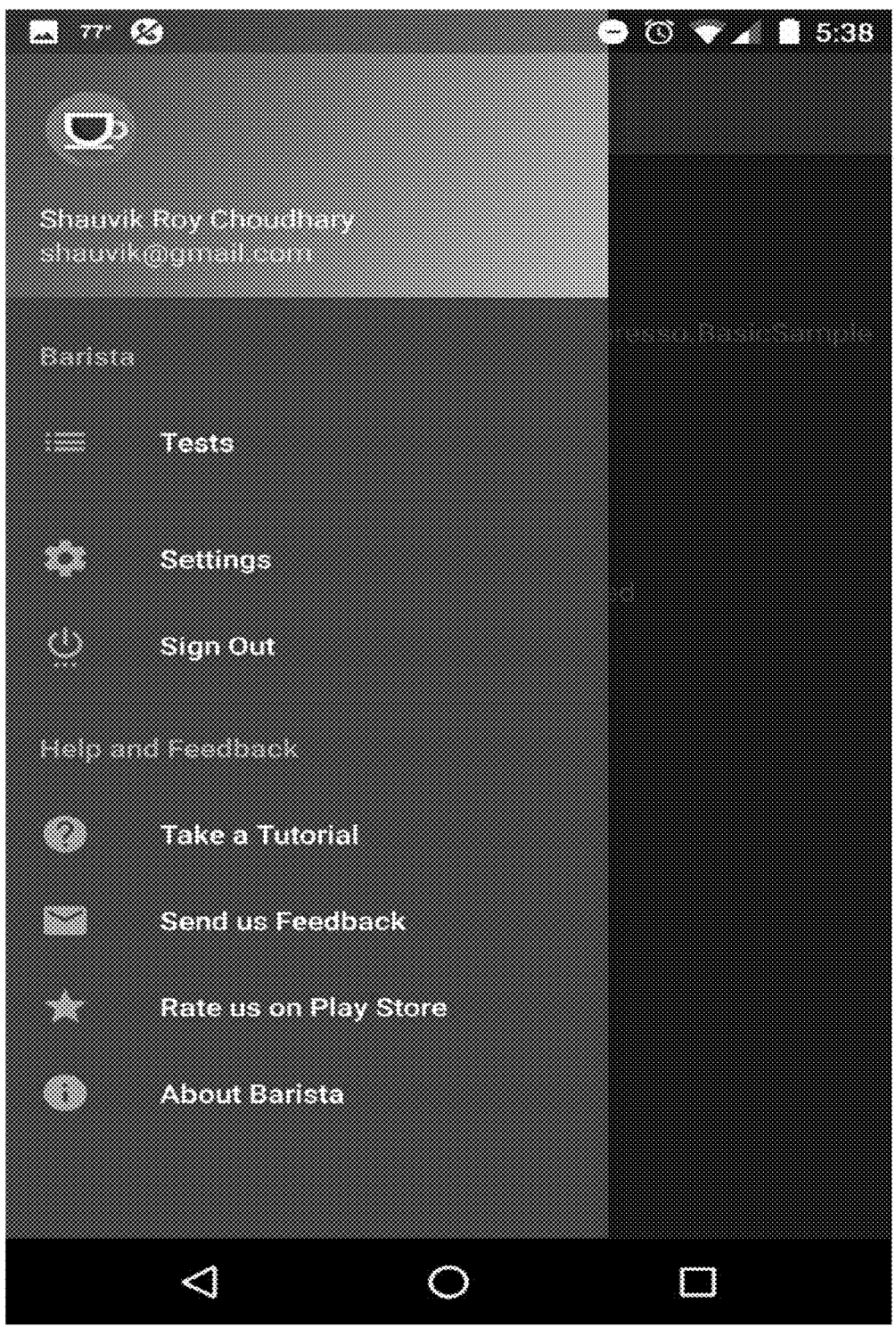
Figure 8:
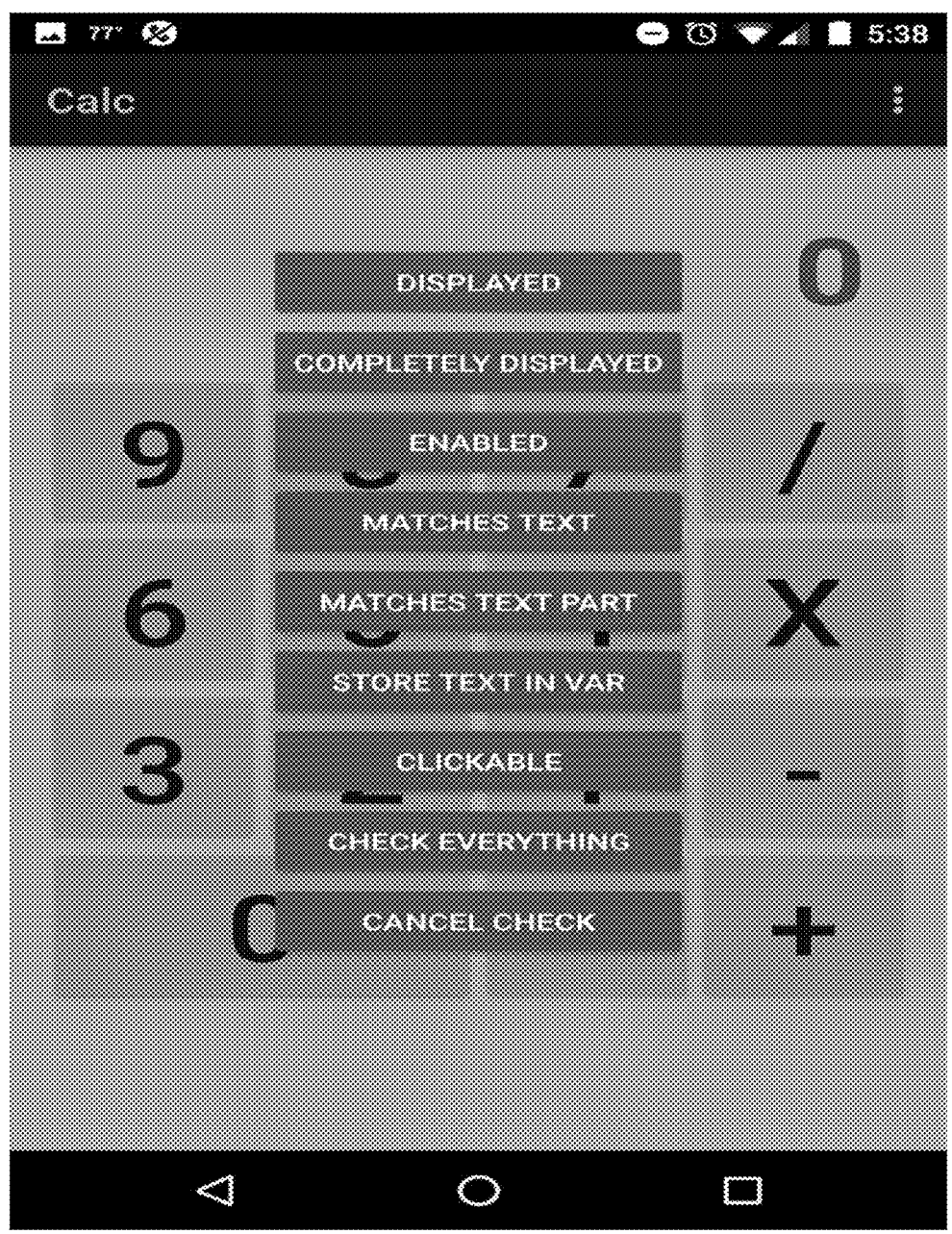
Figure 9:
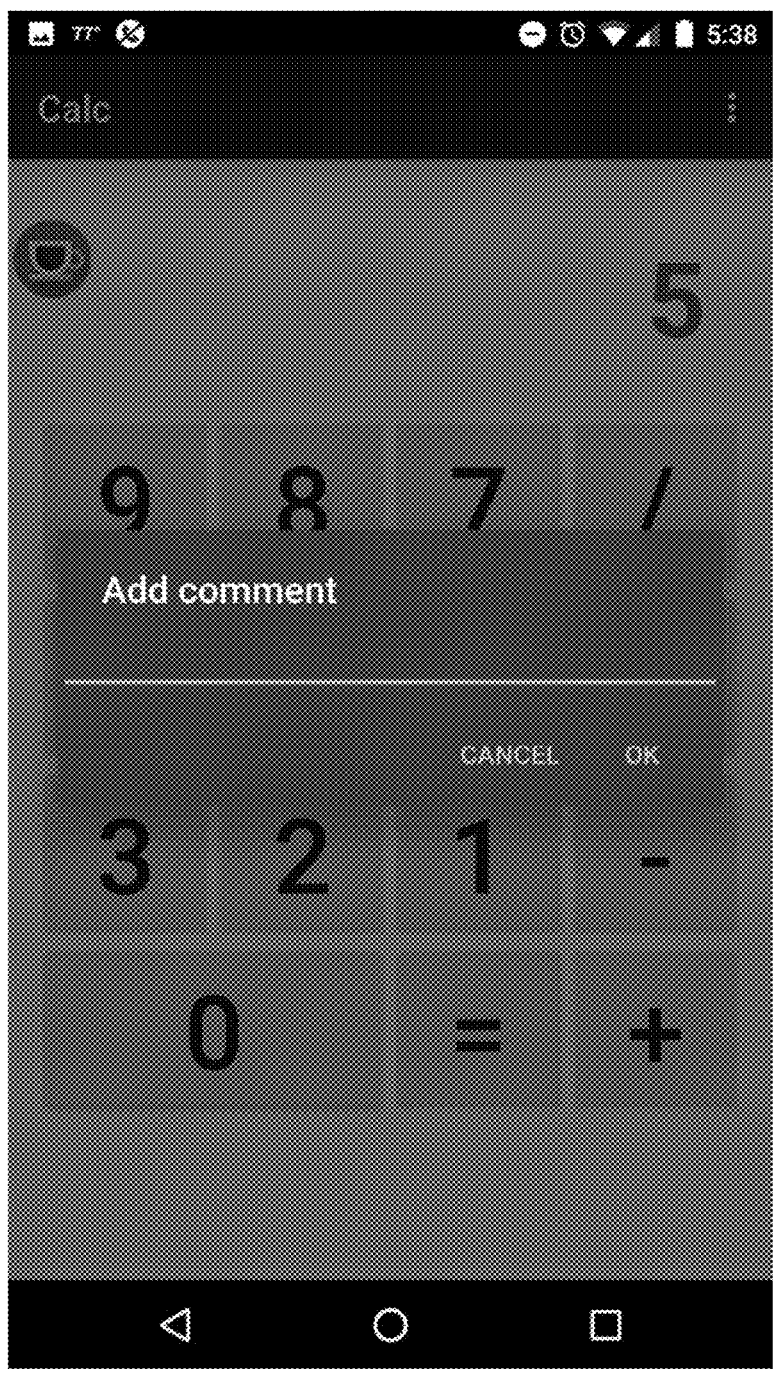
Figure 12:
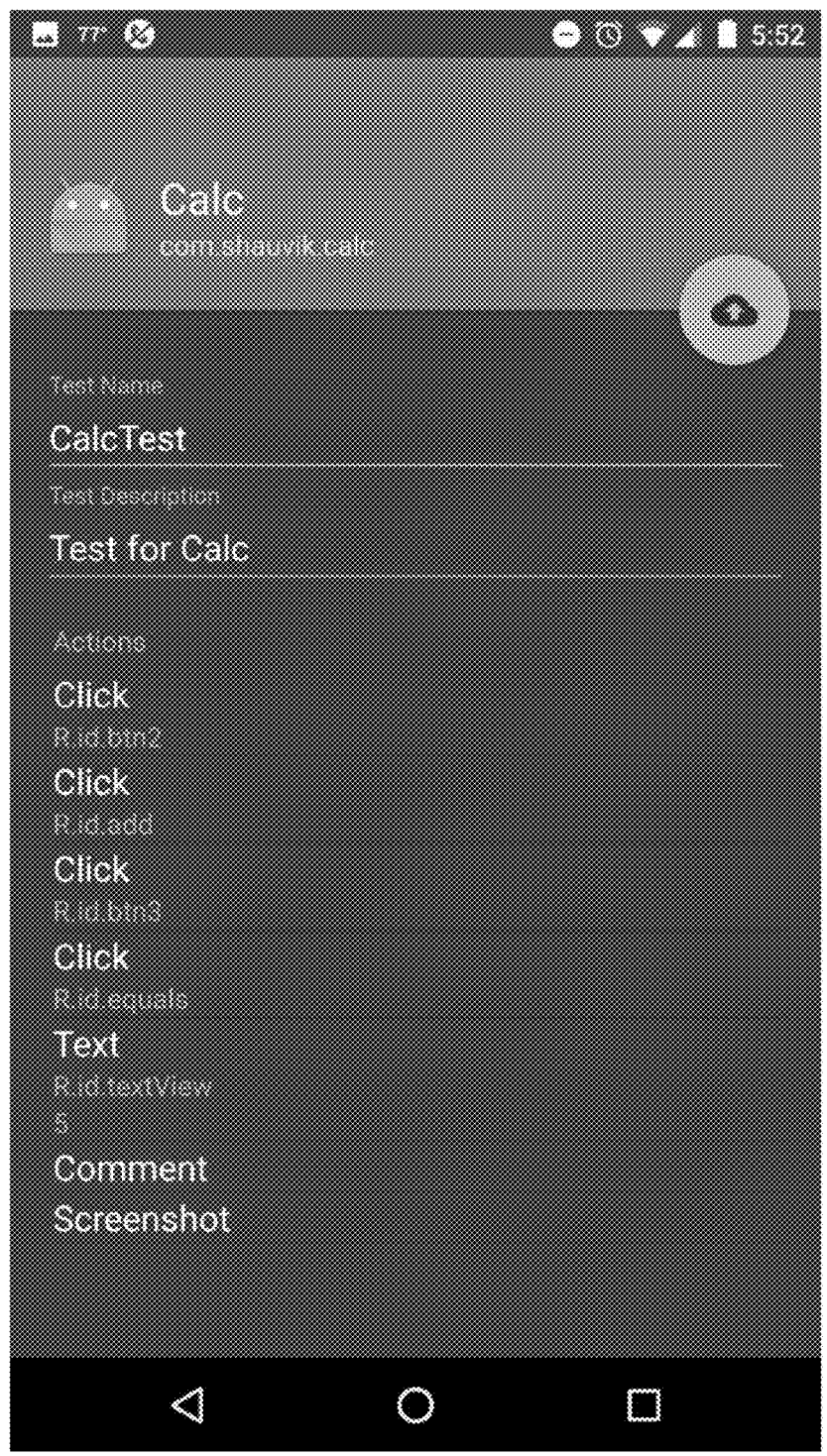
Figure 14:
Figure 15:
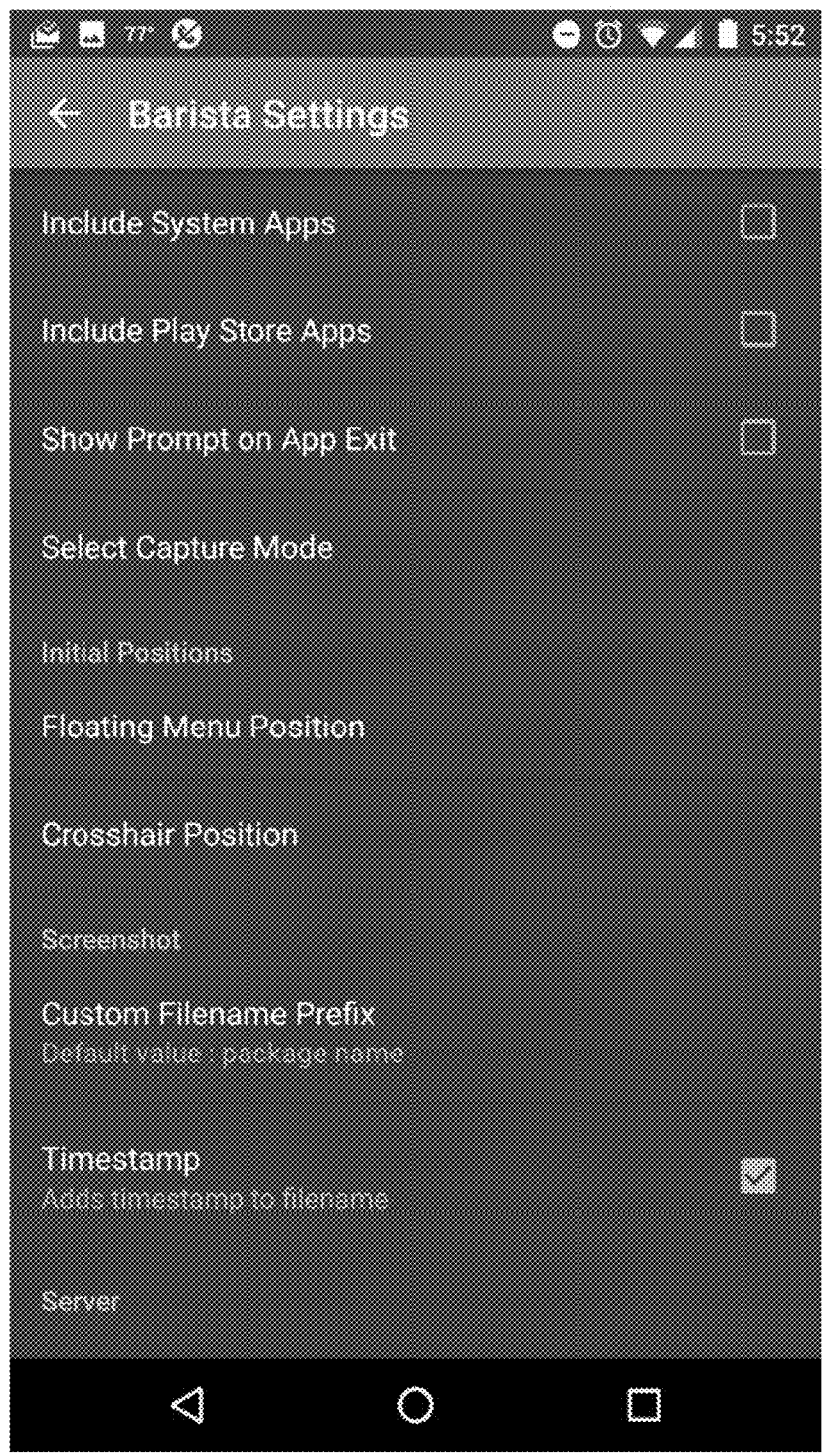

An example user interface experience is described with reference to FIG. 6, according to an embodiment of the invention. When the user launches the application, they can be taken to the start screen 200 (a larger version of 200 is shown on FIG. 2) of the Barista app. This screen 200 can show a list of applications installed on the mobile phone. The user can select an application under test (AUT) from this list, e.g., the Calc app (Action A). This action launches the screen 400 (a larger version of 400 is shown on FIG. 4) with the specific app (Calc in this case) with a movable Barista widget (coffee cup icon) on top of the AUT. When the user interacts with the AUT, Barista records all the interactions and stores them in the current user session. At any point during the test recording, the user can tap on the Barista widget (Action B) to access the contextual menu of Barista, which can allow the user to perform specialized test actions, such as adding a comment into the test (Action D) shown on screen 900 (a larger version of 900 is shown in FIG. 9). Another test action can be to add a check (or assertion) in the test (Action E), which can bring an onscreen inspector shown in screen 800 (a larger version of 800 is shown in FIG. 8) in the form of a Selector widget (cross-hair icon) that can be used to target any UI element on the screen. Once a UI element is targeted (Action F), Barista can provide check options based on the type of the widget (shown on screen 500) (a larger version of 500 is shown in FIG. 5) which can then be selected suitably by the tester to add the specific check. Once the tester has completed recording all test actions and assertions, they can choose "Finish and Upload Test" (Action G) to preview the test on screen 1200 (a larger version of 1200 is shown in FIG. 12) before uploading it to the Barista Web server. Barista can also provide options in its sidebar for supplementary actions. This sidebar screen 300 (a larger version of 300 is shown in FIG. 3) can be accessed by clicking on the Hamburger menu option (Action H). Then from the sidebar, the user can see a list of all tests recorded on screen 1400 (a larger version of 1400 is shown in FIG. 14) (Action I) or tweak Barista's settings on screen 1500 (a larger version of 1500 is shown in FIG. 15) to personalize their user experience (Action J).

Figure 10:
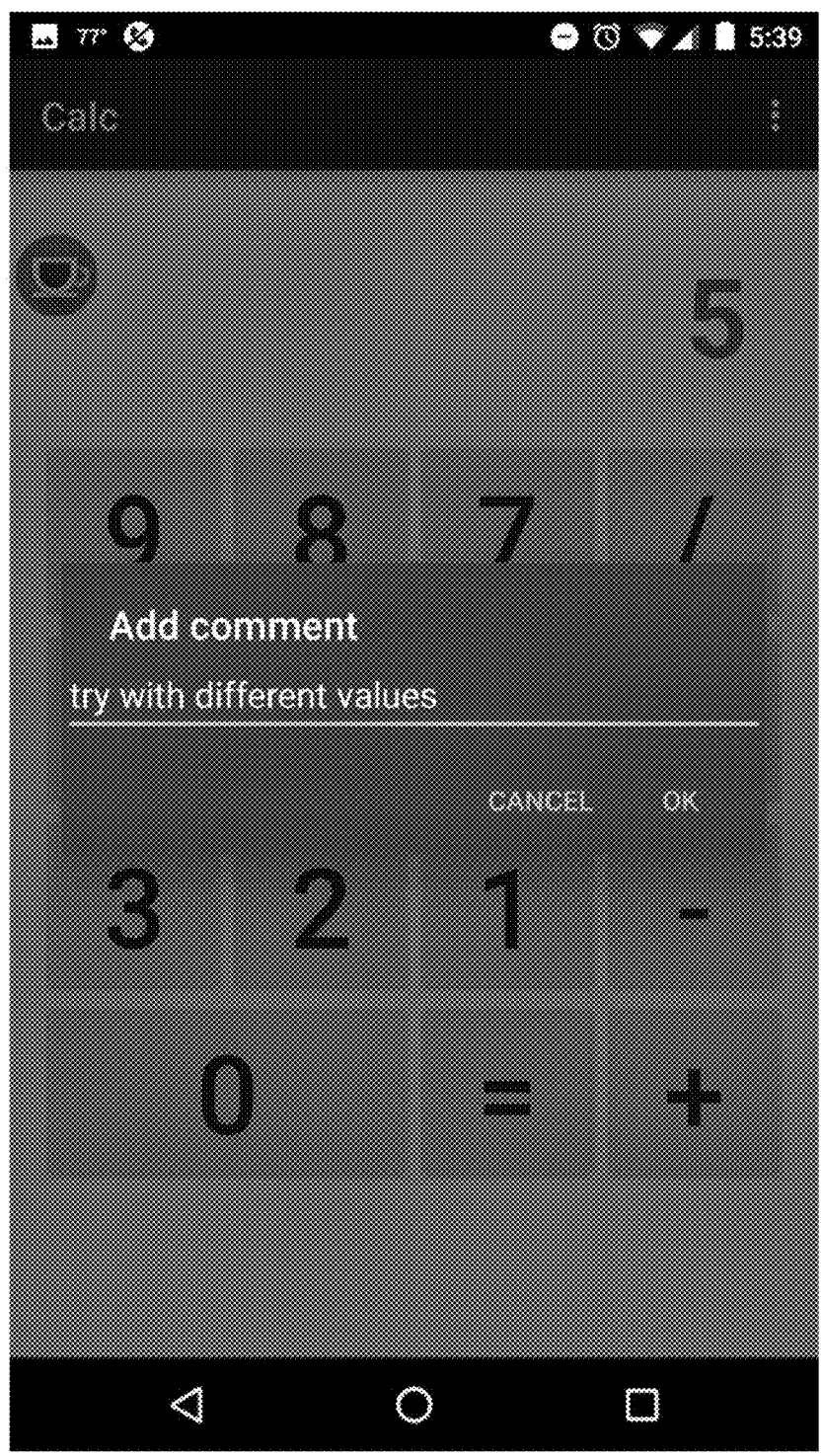
Figure 11:
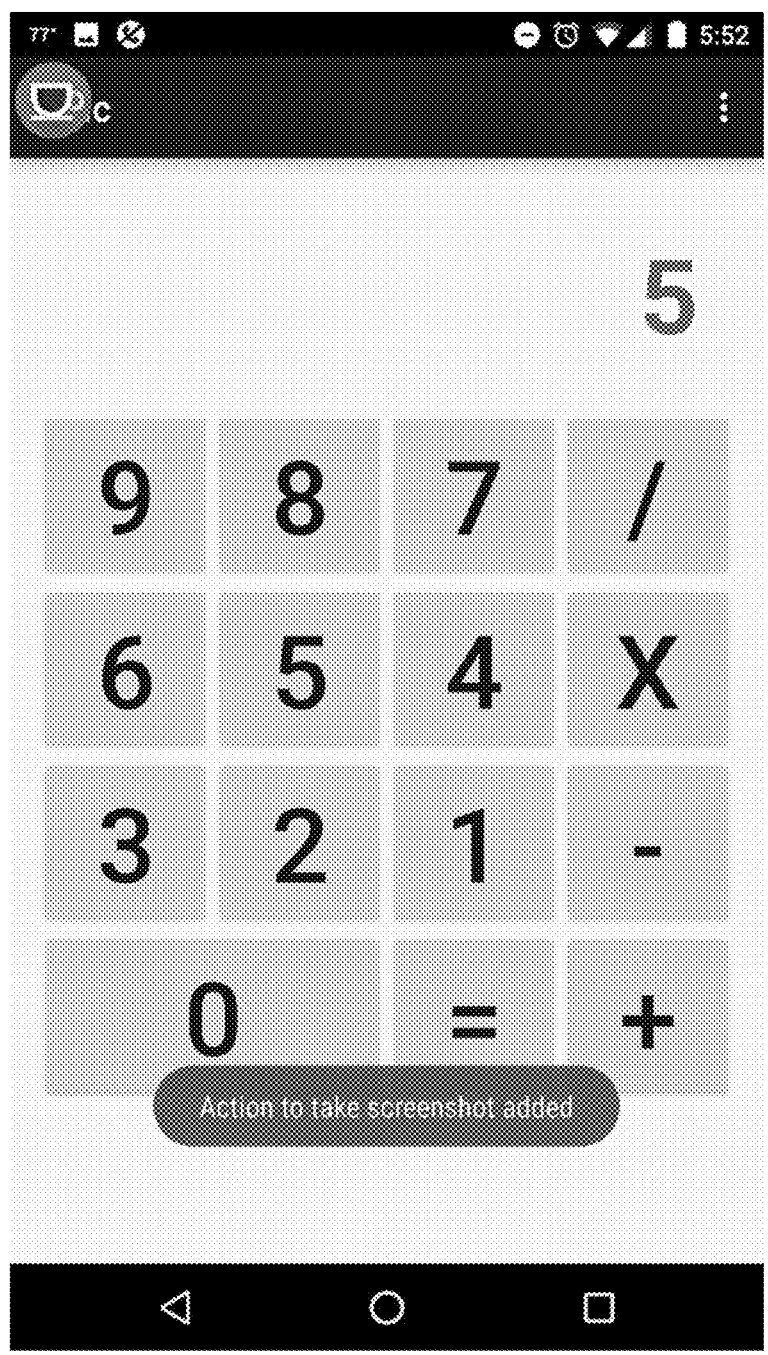
Figure 13:
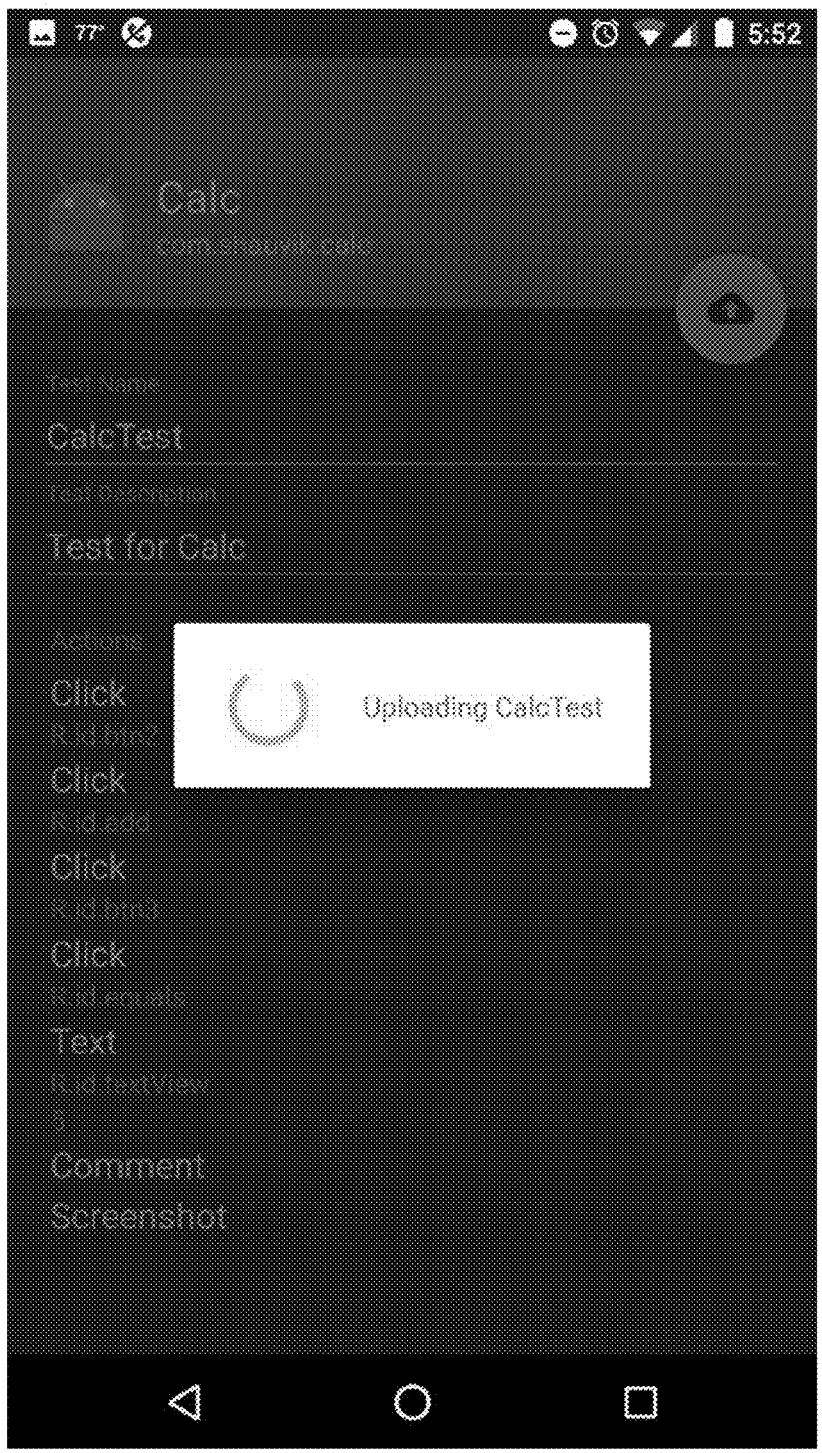
Figure 16:
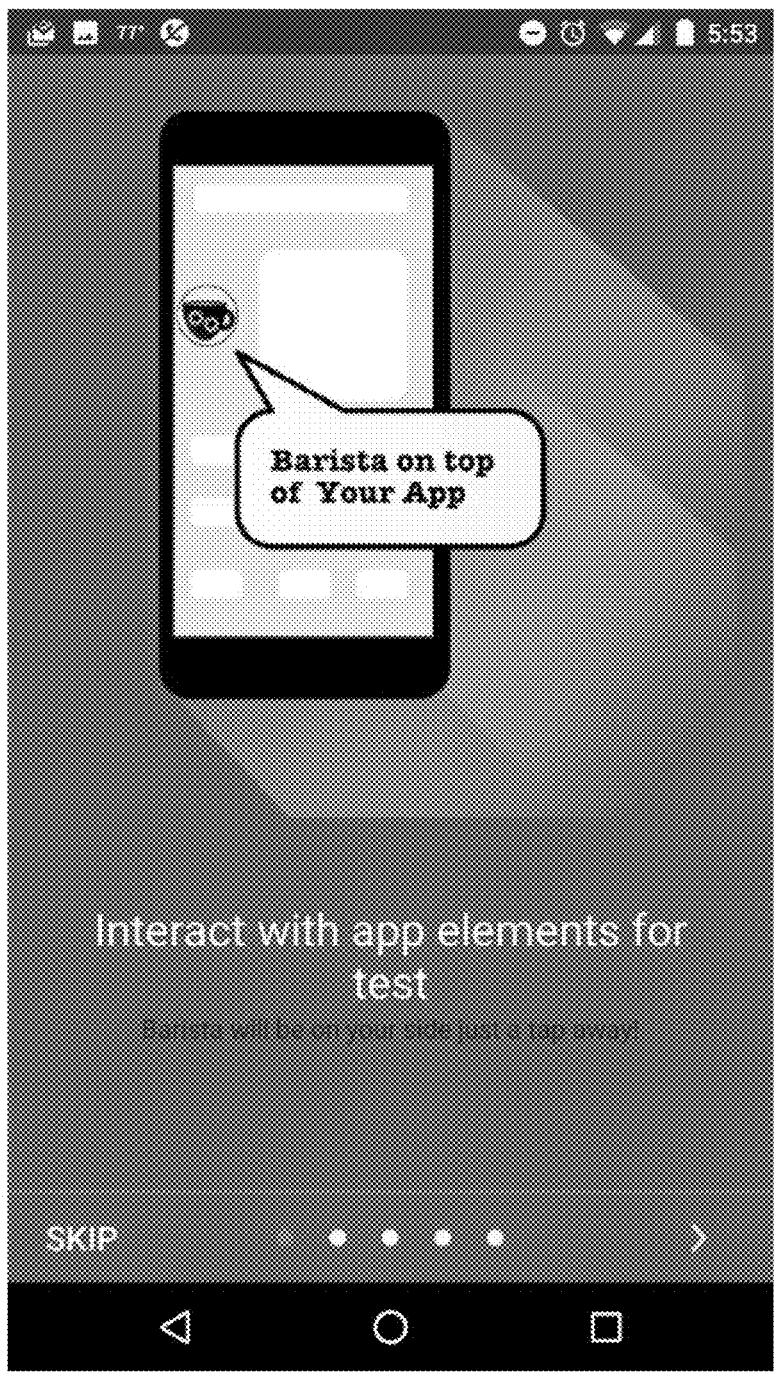
Figure 17:
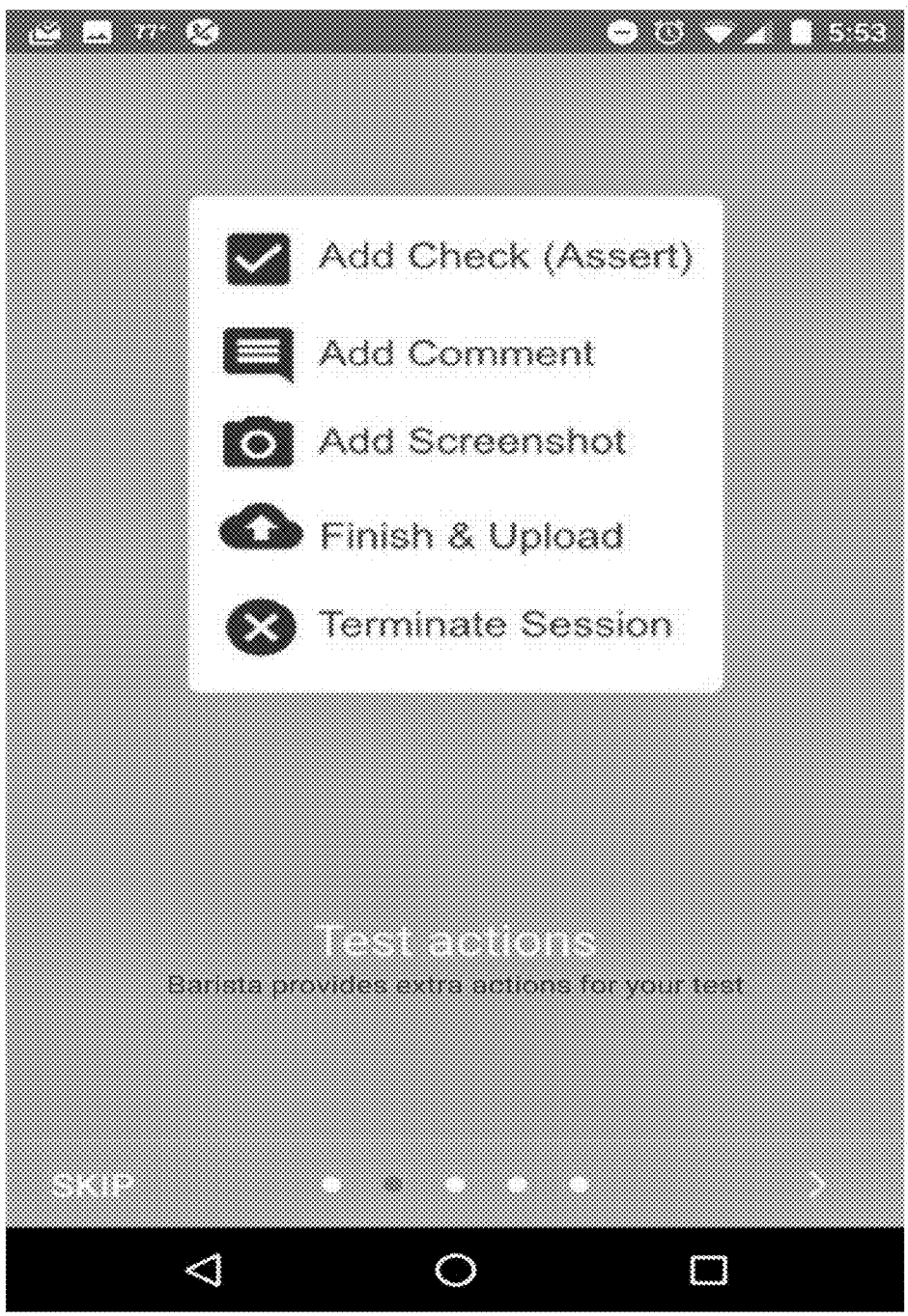

FIG. 10 illustrates an example screenshot allowing a uses to add a comment. FIG. 11 illustrates an example screenshot showing the result of adding a screenshot (e.g., see confirmation at the bottom). FIG. 12 illustrates an example screenshot allowing a user to preview the test before uploading it. This screen shows the user, the different actions and assertions that were recorded as a part of the test. FIG. 13 illustrates an example screenshot that is shown while tests are being uploaded to the server. FIG. 16 illustrates an example screenshot shown when the user chooses to take a BARISTA tutorial. FIG. 17 illustrates another page of the tutorial.

The invention claimed is:

1. A method for testing an application for an Android mobile device, comprising:
    recording interactions between a user and the application on the Android mobile device using only the Android mobile device, wherein the recorded interactions are recorded using at least two types of selectors;
    recording oracles on the Android mobile device using only the Android mobile device, wherein the recorded oracles comprise user-specified expected results of the recorded interactions for the testing of the application, and wherein the recorded oracles are recorded using the at least two types of selectors;
    translating the recorded interactions and the recorded oracles into test scripts on the Android mobile device using only the Android mobile device; and
    testing the application on the Android mobile device by executing the test scripts using only the Android mobile device.

2. The method of claim 1, wherein the recorded oracles cause output of the application to be displayed correctly.

3. The method of claim 1, wherein the test scripts are platform independent and/or are run on different types of devices and/or different operating system versions.

4. The method of claim 3, wherein the test scripts run on multiple platforms.

5. The method of claim 1, wherein the test scripts do not modify the application under test or a runtime system by intercepting the recorded interactions of the user with the application.

6. The method of claim 1, wherein user-defined test cases are encoded as the test scripts.

7. The method of claim 1, wherein the test scripts allow the user to specify expected results of the recorded interactions that are recorded as oracles.

8. The method of claim 1, wherein the test scripts test to ensure that the application behaves correctly under different inputs and conditions.

9. The method of claim 1, wherein the test scripts determine if the application works correctly across multiple Android devices and multiple operating system versions.

10. The method of claim 1, wherein the test scripts automatically encode the recorded interactions and the user-specified expected results of the recorded interactions.

11. The method of claim 1, wherein users record their tests on one platform and rerun the tests on any other platform.

12. The method of claim 1, wherein the test scripts are unaffected by changes in the application that do not modify a user interface.

13. The method of claim 1, wherein the test scripts are used for regression testing.

14. The method of claim 1, wherein the test scripts are run as standalone tests.

15. The method of claim 1, wherein the test scripts are used for compatibility testing.

16. The method of claim 1, wherein the test scripts leverage accessibility mechanisms already present on an Android platform.

17. The method of claim 1, wherein the test scripts do not need to instrument applications under test.

18. A system for testing an application for an Android mobile device, comprising:
    a processor configured to:
    record interactions between a user and the application on the Android mobile device using only the Android mobile device, wherein the recorded interactions are recorded using at least two types of selectors;
    record oracles on the Android mobile device using only the Android mobile device, wherein the recorded oracles comprise user-specified expected results of the recorded interactions for the testing of the application, and wherein the recorded oracles are recorded using the at least two types of selectors;
    translate the recorded interactions and the recorded oracles into test scripts on the Android mobile device using only the Android mobile device; and
    test the application on the Android mobile device by executing the test scripts using only the Android mobile device.

19. The system of claim 18, wherein the recorded oracles cause output of the application to be displayed correctly.

20. The system of claim 18, wherein the test scripts are platform independent and/or are run on different types of devices and/or different operating system versions.

21. The system of claim 20, wherein the test scripts run on multiple platforms.

22. The system of claim 18, wherein the test scripts do not modify the application under test or a runtime system by intercepting the recorded interactions of the user with the application.

23. The system of claim 18, wherein user-defined test cases are encoded as the test scripts.

24. The system of claim 18, wherein the test scripts allow the user to specify expected results of the recorded interactions that are recorded as oracles.

25. The system of claim 18, wherein the test scripts test to ensure that the application behaves correctly under different inputs and conditions.

26. The method system of claim 18, wherein the test scripts determine if the application works correctly across multiple Android devices and multiple operating system versions.

27. The system of claim 18, wherein the test scripts automatically encode the recorded interactions and the user-specified expected results of the recorded interactions.

28. The system of claim 18, wherein users record their tests on one platform and rerun the tests on any other platform.

29. The system of claim 18, wherein the test scripts are unaffected by changes in the application that do not modify a user interface.

30. The system of claim 18, wherein the test scripts are used for regression testing.

31. The system of claim 18, wherein the test scripts are run as standalone tests.

32. The system of claim 18, wherein the test scripts are used for compatibility testing.

33. The system of claim 18, wherein the test scripts leverage accessibility mechanisms already present on an Android platform.

34. The system of claim 18, wherein the test scripts do not need to instrument applications under test.

* * * * *